(12) United States Patent
Lee et al.

(10) Patent No.: US 11,747,878 B2
(45) Date of Patent: Sep. 5, 2023

(54) ELECTRONIC DEVICE CONTROLLING APPLICATION OF POWER AND METHOD FOR OPERATING THEREOF

(71) Applicants: Samsung Electronics Co., Ltd., Gyeonggi-do (KR); Woonyoung Co., Ltd., Chungcheongnam-do (KR)

(72) Inventors: Seongwon Lee, Gyeonggi-do (KR); Seunghyun Hwang, Chungcheongnam-do (KR)

(73) Assignees: Samsung Electronics Co., Ltd., Suwon-si (KR); WoonYoung Co., Ltd., Cheonan-si (KR)

( * ) Notice: Subject to any disclaimer, the term of this patent is extended or adjusted under 35 U.S.C. 154(b) by 0 days.

(21) Appl. No.: 17/691,246

(22) Filed: Mar. 10, 2022

(65) Prior Publication Data

US 2022/0357787 A1  Nov. 10, 2022

Related U.S. Application Data

(63) Continuation of application No. PCT/KR2022/001510, filed on Jan. 27, 2022.

(30) Foreign Application Priority Data

May 10, 2021  (KR) .......................... 10-2021-0060301

(51) Int. Cl.
*G06F 1/32* (2019.01)
*G06F 1/3215* (2019.01)
(Continued)

(52) U.S. Cl.
CPC .......... *G06F 1/3215* (2013.01); *G06F 1/3209* (2013.01); *G06F 1/3296* (2013.01)

(58) Field of Classification Search
CPC .... G06F 1/3209; G06F 1/3215; G06F 1/3296; G06F 1/26; G06F 1/266; H04L 12/10; H04W 52/028
(Continued)

(56) References Cited

U.S. PATENT DOCUMENTS 9,350,164 B2 * 5/2016 Peng ...................... H02H 9/047
2006/0279885 A1 * 12/2006 Sung ...................... H02H 9/042
361/42
(Continued)

FOREIGN PATENT DOCUMENTS

JP  07-336884 A  12/1995
JP  2013-066274 A  4/2013
(Continued)

*Primary Examiner* — Chun Cao
(74) *Attorney, Agent, or Firm* — Cha & Reiter, LLC

(57) ABSTRACT

According to various embodiments, an electronic device comprises: an input terminal configured to receive alternating current (AC) power from an external source; an output terminal configured to output the AC power; a solid state relay (SSR) configured to selectively connect the input terminal and the output terminal, the SSR comprising a zero-crossing detector, wherein the zero-crossing detector is configured to detect a zero voltage of a voltage associated with at least one voltage of the input terminal and/or the output terminal; a bypass circuit connected in parallel to the SSR and configured to selectively connect the input terminal and the output terminal; and a controller, wherein the controller is configured to: obtain a power supply interruption command while supplying the AC power to the output terminal via the bypass circuit, turn on the SSR, based on the obtaining of the power supply interruption command, turn off the bypass circuit, based on the lapse of a first period after turning on the SSR, and turn off the SSR, based on the lapse of a second period after turning off the bypass circuit, and wherein when the SSR is on, the SSR is configured to release a connection between the input terminal and the output terminal when the zero-crossing detector detects substantially 0V at the input terminal.

20 Claims, 17 Drawing Sheets

(51) Int. Cl.
*G06F 1/3296* (2019.01)
*G06F 1/3209* (2019.01)

(58) Field of Classification Search
USPC ........................................................ 713/323
See application file for complete search history.

(56) References Cited

U.S. PATENT DOCUMENTS

| | | | |
|---|---|---|---|
| 2008/0247106 A1* | 10/2008 | Divan | H02H 9/001 |
| | | | 361/58 |
| 2012/0063047 A1* | 3/2012 | Divan | H02H 9/001 |
| | | | 361/93.9 |
| 2012/0326514 A1 | 12/2012 | Kim et al. | |
| 2013/0113453 A1* | 5/2013 | Shilling | H05B 47/26 |
| | | | 323/311 |
| 2013/0200701 A1* | 8/2013 | Yuasa | H02J 1/08 |
| | | | 307/11 |
| 2014/0184419 A1* | 7/2014 | Smith | G08B 25/08 |
| | | | 340/693.1 |
| 2016/0019769 A1* | 1/2016 | Mumey | G08B 21/14 |
| | | | 340/632 |
| 2020/0052688 A1 | 2/2020 | Orozco | |

FOREIGN PATENT DOCUMENTS

| | | |
|---|---|---|
| KR | 2001-0001946 A | 1/2001 |
| KR | 2002-0059037 A | 7/2002 |
| KR | 10-2012-0140437 A | 12/2012 |

\* cited by examiner

ELECTRONIC DEVICE CONTROLLING APPLICATION OF POWER AND METHOD FOR OPERATING THEREOF

CROSS REFERENCE TO RELATED APPLICATION(S)

This application is a continuation application, claiming priority under § 365(c), of an International application No. PCT/KR2022/001510, filed on Jan. 27, 2022, which is based on and claims the benefit of a Korean patent application number 10-2021-0060301, filed on May 10, 2021, in the Korean Intellectual Property Office, the disclosures of which is incorporated by reference herein in its entirety.

TECHNICAL FIELD

Various embodiments relate to an electronic device for controlling power application and an operation method thereof.

BACKGROUND

In industrial environments, equipment may include multiple devices ("multiple equipments") and may be arranged in a variety of ways. For operation, the multiple equipments may receive power from a power source. Generally, each of the multiple equipments may include a plug which is insertable into an outlet for a power source.

In order to operate each of the multiple equipments, a user may directly insert a plug into an outlet. Thereafter, the user may input an operating command via an input device (e.g., a button or a touch screen) included in the equipment. Alternatively, the user may remotely transmit an operating command to a communication module included in the equipment. In order to interrupt power supply to at least some of the multiple equipments, the user may input/remotely transmit an interruption command.

When the power supply is started, inrush current may occur, and when power supply is interrupted, a surge voltage may occur. Inrush current and/or surge voltage may cause damage to equipment. Accordingly, there is a need to suppress inrush current and/or surge voltage even in a case when power application is started and/or power application is interrupted.

SUMMARY

According to various embodiments, an electronic device comprises: an input terminal configured to receive alternating current (AC) power from an external source; an output terminal configured to output the AC power; a solid state relay (SSR) configured to selectively connect the input terminal and the output terminal, the SSR comprising a zero-crossing detector, wherein the zero-crossing detector is configured to detect a zero voltage of a voltage associated with at least one voltage of the input terminal and/or the output terminal; a bypass circuit connected in parallel to the SSR and configured to selectively connect the input terminal and the output terminal; and a controller, wherein the controller is configured to: obtain a power supply interruption command while supplying the AC power to the output terminal via the bypass circuit, turn on the SSR, based on the obtaining of the power supply interruption command, turn off the bypass circuit, based on the lapse of a first period after turning on the SSR, and turn off the SSR, based on the lapse of a second period after turning off the bypass circuit, and wherein when the SSR is on, the SSR is configured to release a connection between the input terminal and the output terminal when the zero-crossing detector detects substantially 0V at the input terminal.

According to various embodiments, an operation method of an electronic device comprising an input terminal configured to receive an alternating current power from an external source, an output terminal configured to output the alternating current power, an solid state relay (SSR) configured to selectively connect the input terminal and the output terminal, a bypass circuit connected in parallel to the SSR and configured to selectively connect the input terminal and the output terminal, and a controller, wherein the SSR comprises a zero-crossing detector configured to detect substantially 0V at the input terminal, comprises: obtaining, by the controller, a power supply interruption command for the alternating current (AC) power while supplying the alternating current power to the output terminal via the bypass circuit; turning on the SSR, based on the obtaining the power supply interruption command; turning off the bypass circuit, based on the lapse of a first period after turning on the SSR; turning off the SSR, based on the lapse of a second period after turning off the bypass circuit; and when the SSR is on, disconnecting the input terminal and the output terminal, by the SSR when the zero-crossing detector detects substantially 0V at the input terminal.

DETAILED DESCRIPTION

In an electronic device and an operation method thereof according to various embodiments, a case where power application is started/interrupted, a solid state relay (SSR) switch and a bypass circuit connected in parallel are operated to prevent damage to the equipment from inrush current and/or surge voltage.

FIGS. 1A-1E show an electronic device 101 that supplies power to an external device 150a, while preventing damage from inflow current/surge voltage.

External device 150a may receive power from a power source 2a by placing plug 151a into the power source 2a. Thereafter, the user may cause use a control on the external device 150a, causing the operational portion of the external device 150a to receive power. Alternatively, the user may remotely transmit an operating command to the external device 150a. In order to interrupt power supply, the user may use the control on the external device 150a or remotely transmit an interruption command.

When the power supply is started, inrush current may occur, and when power supply is interrupted, a surge voltage may occur. Inrush current and/or surge voltage may cause damage the external device 150a.

To prevent this, the user can plug the external device 150a into electronic device 101 and plug the electronic device 101 in the power source 2a. The electronic device 101 supplies power to the external device 150a, while preventing damage from inrush current and/or surge voltage.

Electronic Device, External Device, and Power Source

FIG. 1A to FIG. 1E are diagrams of an electronic device according to various embodiments.

Figure 1A:
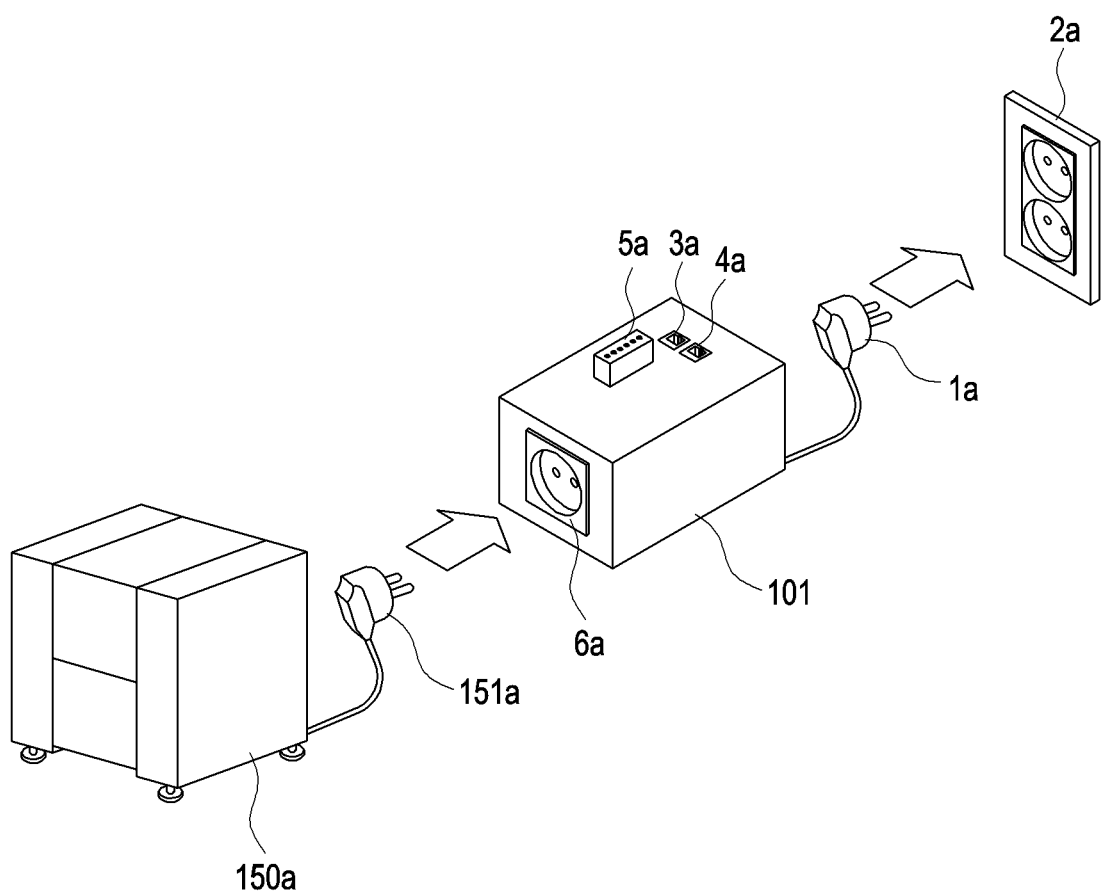
FIG. 1A to FIG. 1E are diagrams of an electronic device according to various embodiments of the disclosure.

Referring to FIG. 1A, an electronic device 101 according to various embodiments may include at least one of at least one power interface 1a and 6a, at least one communication interface 3a and 4a, or a signal input/output interface 5a. As illustrated in FIG. 1A, the at least one communication interface 3a and 4a and the signal input/output interface 5a are arranged on one surface of a housing of the electronic device 101, the first power interface 1a is disposed on a different surface of the housing, and the second power interface 6a is disposed on another different surface of the housing. However, this illustration merely corresponds to an example, the arrangement positions of the individual components are not limited to the illustration.

According to various embodiments, the first power interface 1a may include, to supply power having single-phase voltage, at least one of a wire, a plug, or a contact point (this is used together with an input terminal in the disclosure) for an element which is in the housing and connected to the wire, but the disclosure is not limited thereto. The plug included in the first power interface 1a may be implemented in various types, for example, an F-type plug, SJ-P4531, or a terminal block, and there is no limit to the implementation type thereof. The first power interface 1a may be connected to and receive power from a power source (2a) (e.g., an outlet).

The second power interface 6a may include, to supply power having single-phase voltage, at least one of an outlet or a contact point (this is used together with an output terminal in the disclosure) for an element which is in the housing and connected to the outlet, but the disclosure is not limited thereto. The outlet included in the second power interface 6a may be implemented in various types, for example, an F-type outlet, SJ-C5541, or a terminal block, and there is no limit to the implementation type thereof. The second power interface 6a may be connected to an external device 150a which supports single-phase voltage.

In various embodiments, the second power interface 6a may mimic the outlet of the power source 2a to accommodate plug 151a.

The external device 150a may include a plug 151a corresponding to the implementation type of the outlet included in the second power interface 6a. The plug 151a may be inserted in the second power interface 6a, whereby the electronic device 101 and the external device 150a can be connected. The electronic device 101 may supply power received via the first power interface 1a from the power source 2a, to the external device 150a via the second power interface 6a. Alternatively, the electronic device 101 may interrupt power supply while supplying power to the external device 150a via the second power interface 6a. A detailed operation related to start of power supply and/or interruption of power supply will be described later.

Plug 151a, first power interface 1a and second power interface 6a may be in accordance with a predetermined standard according to locale, such as country where the power source 2a is located. Thus, connection of plug 151a into second power interface 6a, and connection of first power interface 1a to power source 2a may simulate direct connection of plug 151a into power source 2a, except for inflow current and surge voltage, so as to be indistinguishable to the user.

According to various embodiments, the first communication interface 3a and/or the second communication interface 4a may be connected to at least one different external device (not illustrated) through a wired communication line. For example, in a case where the wired communication line follows the RS 485 standard, the first communication interface 3a and/or the second communication interface 4a may be implemented by an RJ 45 terminal. However, the foregoing is only by way of example, and not limitation.

The first communication interface 3a and the second communication interface 4a, may, according to various embodiments, accommodate remote controlling such as remotely "turning on" and "turning off" electronic device 101. The first communication interface 3a and/or the second communication interface 4a may be implemented to follow the same communication standard, but may be implemented to support different communication standards (e.g., RS-485 and Ethernet) according to an implementation thereof. Alternatively, according to a different implementation, the electronic device 101 may be implemented to include, as well as the first communication interface 3a and the second communication interface 4a following the same communication standard (e.g., RS-485), a third communication interface (not illustrated) following a different communication standard (e.g., Ethernet). The electronic device 101 may transmit or receive data to at least one different external device via the first communication interface 3a and/or the second communication interface 4a. In an example, when data received via the first communication interface 3a is for the electronic device 101, the electronic device 101 may perform an operation corresponding to the corresponding data, or when the data is for a different electronic device, the electronic device may forward the corresponding data to the second communication interface 4a. A connection between the electronic device 101 and at least one different external device (not illustrated) through a wired communication line will be described with reference to FIG. 1C.

According to various embodiments, although not illustrated, the signal input/output interface 5a may be connected to the external device 150a through a wired communication line. It shall be understood that the foregoing are by way of example, and not limitation. As described above, in an example, the electronic device 101 may perform an operation of the electronic device 101 by using data received via the first communication interface 3a. As another example, the electronic device 101 may receive data for controlling an operation of the external device 150*a* via the first power interface 3*a*. The electronic device 101 may generate a signal corresponding to the received data, and provide the signal to the external device 150*a* via the signal input/output interface 5*a*.

The external device 150*a* may perform an operation corresponding to the signal from the electronic device 101. Alternatively, the electronic device 101 may receive a signal from the external device 150*a* via the signal input/output interface 5*a*. The electronic device 101 may operate based on the received signal, and/or may provide data corresponding to the received signal to a different external device via a communication interface 3*a* and/or 4*a*. For example, based on reception of a signal associated with a power supply request from the external device 150*a*, the electronic device 101 may supply power to the external device 150*a* via the second power interface 6*a*. Alternatively, based on reception of a signal associated with a power supply interruption request from the external device 150*a*, the electronic device 101 may stop supplying power which is being supplied via the second power interface 6*a*. Alternatively, the electronic device 101 may transmit information associated with the external device 150*a* to the different external device via a communication interface 3*a* and/or 4*a*.

Figure 1B:
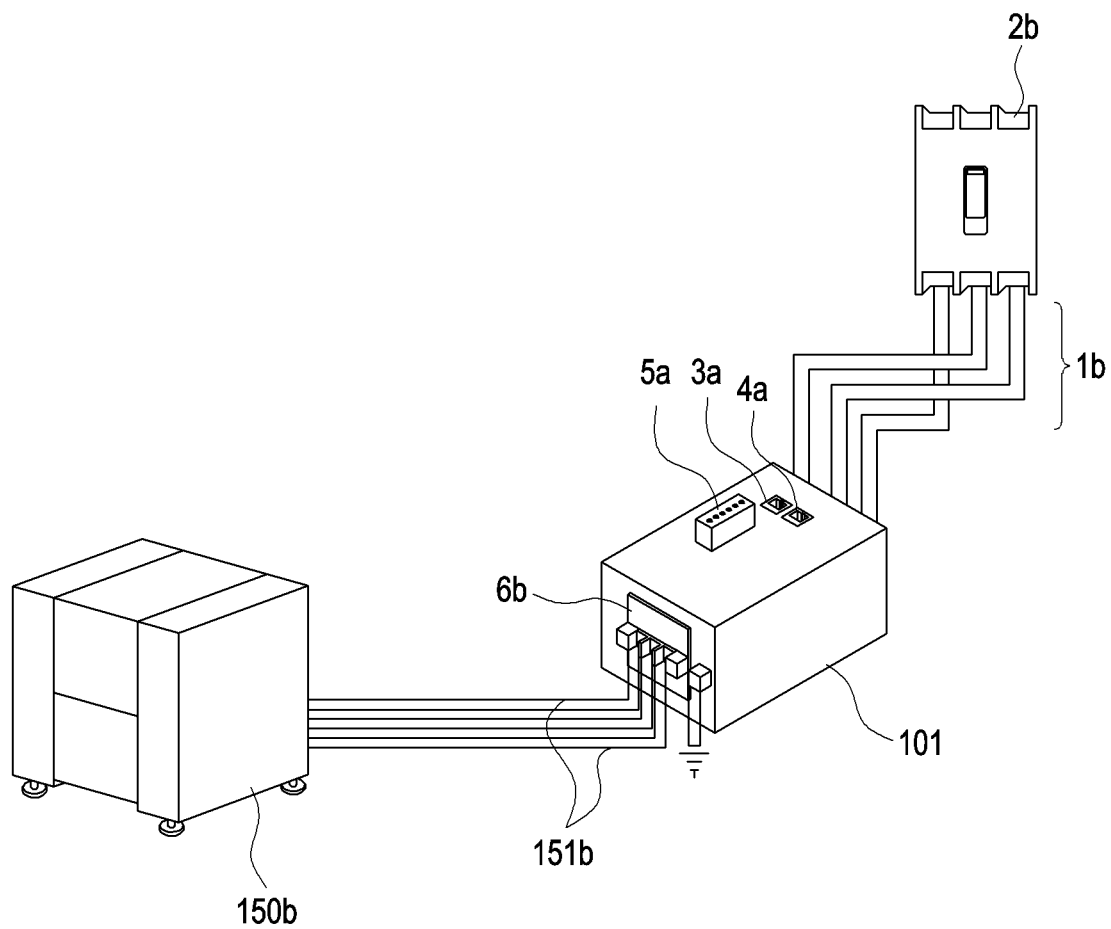

Referring to FIG. 1B, the electronic device 101 according to various embodiments may include at least one of at least one power interface 1*b* and 6*b*, the at least one communication interface 3*a* and 4*a*, or the signal input/output interface 5*a*. In an embodiment of FIG. 1B, a detailed description of the elements described with reference to FIG. 1A will be omitted.

According to various embodiments, the first power interface 1*b* may include, to supply power having three-phase voltage, at least one of a wire, a plug, or a contact point for an element which is in the housing and connected to the wire, but the disclosure is not limited thereto. As illustrated in FIG. 1B, each of three wires included in the first power interface 1*b* may transmit three-phase power from a three-phase voltage source 2*b*. The second power interface 6*b* may include, to supply power having three-phase voltage, at least one of an outlet or a contact point (this is used together with an output terminal in the disclosure) for an element which is in the housing and connected to the outlet, but the disclosure is not limited thereto. The second power interface 6*b* may be connected to an external device 150*b* which supports three-phase voltage. The external device 150*b* may include three wires 151*b* so as to be connected to the second power interface 6*b*. Each of the three wires 151*b* may transmit three-phase power from the electronic device 101. The electronic device 101 may supply power having three-phase voltage received via the first power interface 1*b* from the power source 2*b*, to the external device 150*b* via the second power interface 6*b*. Alternatively, the electronic device 101 may interrupt power supply while supplying power to the external device 150*b* via the second power interface 6*b*. Although not illustrated, the electronic device 101 may be implemented to be included in an equipment. For example, rather than the electronic device 101 being connected by wire to the external device 150*a* or 150*b*, which is an equipment, as illustrated in FIG. 1A or FIG. 1B, at least one element of the electronic device 101 may be implemented to be included in the external device 150*a* or 150*b*.

Figure 1C:
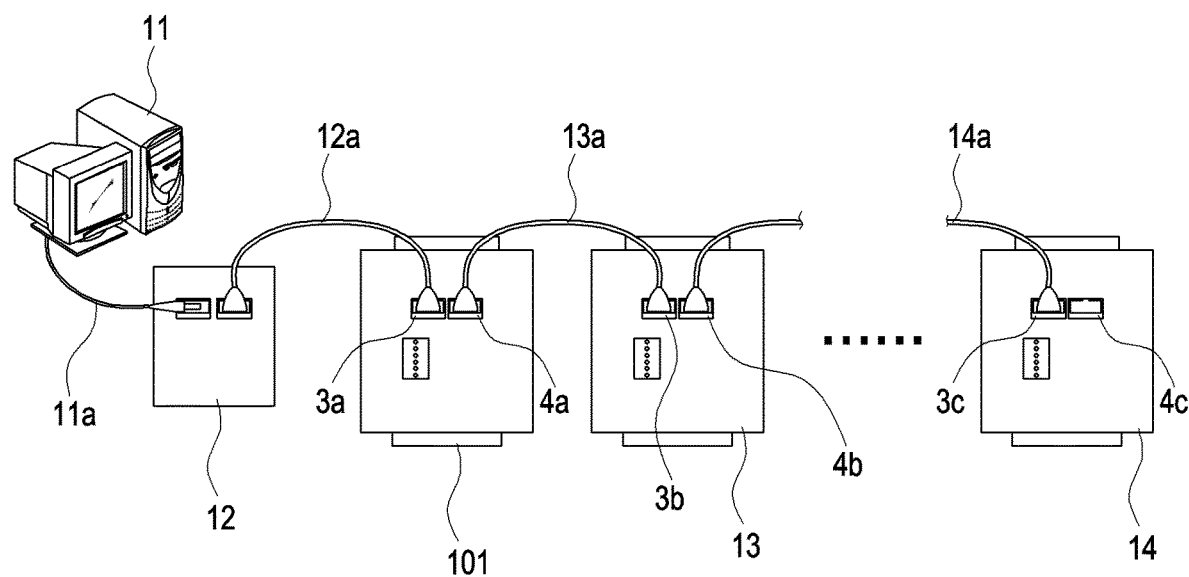

Referring to FIG. 1C, the electronic device 101 according to various embodiments may be connected to a master module 12 through the first communication interface 3*a* and a communication line 12*a*. The communication line 12*a* may follow, for example, the RS 485 communication protocol, but is not limited thereto. For example, the master module 12 may transmit or receive data to or from multiple devices 101, 13, and 14 connected thereto. In the RS 485 communication protocol, the master module 12 may be a master device, and the multiple devices 101, 13, and 14 may be slave devices. The master module 12 may be connected to a system control device 11 through a communication line 11*a*. The communication line 11*a* may follow, for example, the Ethernet protocol, but is not limited thereto. If the communication line 11*a* follows the Ethernet protocol, and the communication line 12*a* follows the RS 485 communication protocol, the master module 12 may convert Ethernet protocol-based data from the system control device 11 into data following the RS 485 communication protocol, and provide the converted data to at least some of the multiple devices 101, 13, and 14. Alternatively, the master module 12 may convert data following the RS 485 communication protocol from at least some of the multiple devices 101, 13, and 14 into Ethernet protocol-based data, and provide the converted data to the system control device 11. According to the above description, an Ethernet IP address may be required to be assigned for the master module 12, and it may be possible to control multiple (e.g., 253) slave devices via the master module 12 in accordance with the RS 485 communication protocol. The difference between a communication protocol between the system control device 11 and the master module 12, and a communication protocol between the master module 12 and the electronic device 101 merely corresponds to an example, and the communication protocols can be the same.

According to various embodiments, the electronic device 13 and/or the electronic device 14 may be the same model as the electronic device 101. The electronic device 13 may include a first communication interface 3*b* and a second communication interface 4*b*, and the electronic device 14 may include a first communication interface 3*c* and a second communication interface 4*c*. The electronic device 101 and the electronic device 13 may be connected to each other via the second communication interface 4*a*, a communication line 13*a*, and the first communication interface 3*b*. The electronic device 13 and the electronic device 14 may be connected to each other via the second communication interface 4*b*, a communication line 14*a*, and the first communication interface 3*c*.

The system control device 11 according to various embodiments may control the multiple devices 12, 101, 13, and 14. For example, the system control device 11 may transmit a command for an operation to the multiple devices 12, 101, 13, and 14. If the system control device 11 determines to supply power to the external device 150*a*, which is an equipment connected to the electronic device 101 (or receives a command), the system control device 11 may provide a power supply start command to the electronic device 101.

For example, the system control device 11 may provide an Ethernet-based power supply start command to the master module 12. The power supply start command may include identification information of the electronic device 101 and/or identification information of the external device 150*a* connected to the electronic device 101. The master module 12 may transmit, to the electronic device 101, data obtained by changing the power supply start command, based on the RS 485 protocol. For example, the master module 12 may provide the converted data to the electronic device 101, based on the identification information of the electronic device 101 and/or the identification information of the external device 150*a* connected to the electronic device 101. The electronic device 101 may start power supply, based on the received data, and an operation for start of power supply will be described later. The master module 12 being implemented as an entity independent to the electronic device 101 merely corresponds to an example. The master module 12 may be implemented to be included in the electronic device 101, or at least some of the functions of the master module 12 may be implemented to be supported by the electronic device 101.

For example, the system control device 11 may provide an Ethernet-based power interruption command to the master module 12. The power interruption command may include identification information of the electronic device 13 and/or identification information of an external device connected to the electronic device 13. The master module 12 may transmit, to the electronic device 13, data obtained by changing the power interruption command, based on the RS 485 protocol. For example, the master module 12 may provide the converted data to the electronic device 13, based on the identification information of the electronic device 13 and/or the identification information of the external device connected to the electronic device 13. The electronic device 13 may interrupt power supply, based on the received data, and an operation for interruption of power supply will be described later.

For example, the system control device 11 may receive sensing data (e.g., at least one of voltage, current, power, impedance, or temperature) from the electronic devices 12, 101, 13, and 14. The system control device 11 may display the received sensing data, and a system manager may identify the displayed sensing data. In order to distribute electric costs occurring in a case where power for multiple equipments in a factory is collectively input, the system control device 11 may perform control the power to be sequentially input for each equipment. Alternatively, the system control device 11 may perform an operation configured based on sensing data. For example, sensing data of the electronic device 101 may be provided to the system control device 11 while the electronic device 101 supplies power to the external device 150*a*. If a power interruption condition (e.g., at least one of overtemperature, overvoltage, or overcurrent) is satisfied based on the sensing data, the system control device 11 may provide a power interrupt command to the electronic device 101. In an example, the electronic devices 101, 13, and 14 may be connected to the master module 12 in a circular network type, and accordingly, even when an error occurs in an electronic device, it may be possible to control the remaining electronic devices. For example, the communication interface 4*c* of the electronic device 14 illustrated in FIG. 1C may be connected in a circular network type by being connected to the master module 12 or the system control device 11.

Figure 1D:
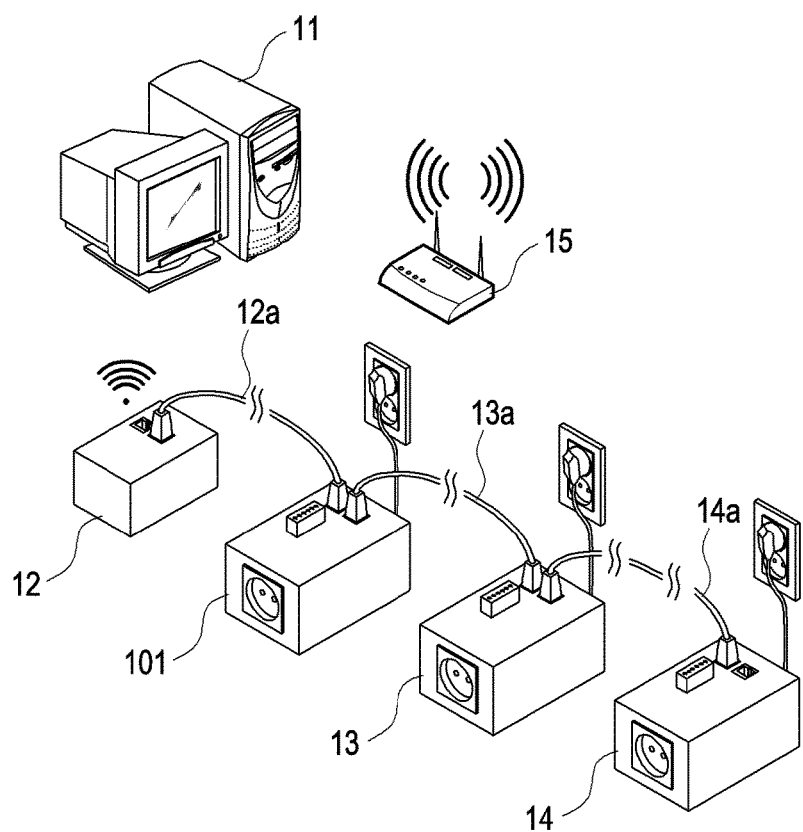

Referring to FIG. 1D, the system control device 11 and the master module 12 according to various embodiments may wirelessly transmit or receive data via an access point 15. A communication scheme supported by the access point 15 may be, for example, a WiFi scheme, but there is no limit to the communication scheme. Similarly in this case, if a short-range communication connection for the master module 12 is established, it may be possible to control multiple (e.g., 253) slave devices via the master module 12 in accordance with the RS 485 communication protocol. In a case where the communication scheme supported by the access point 15 is WiFi, it may be possible to control multiple (e.g., 253) slave devices via the master module 12 in accordance with the RS 485 communication protocol, based on assignment of an IP address for the master module 12.

Figure 1E:
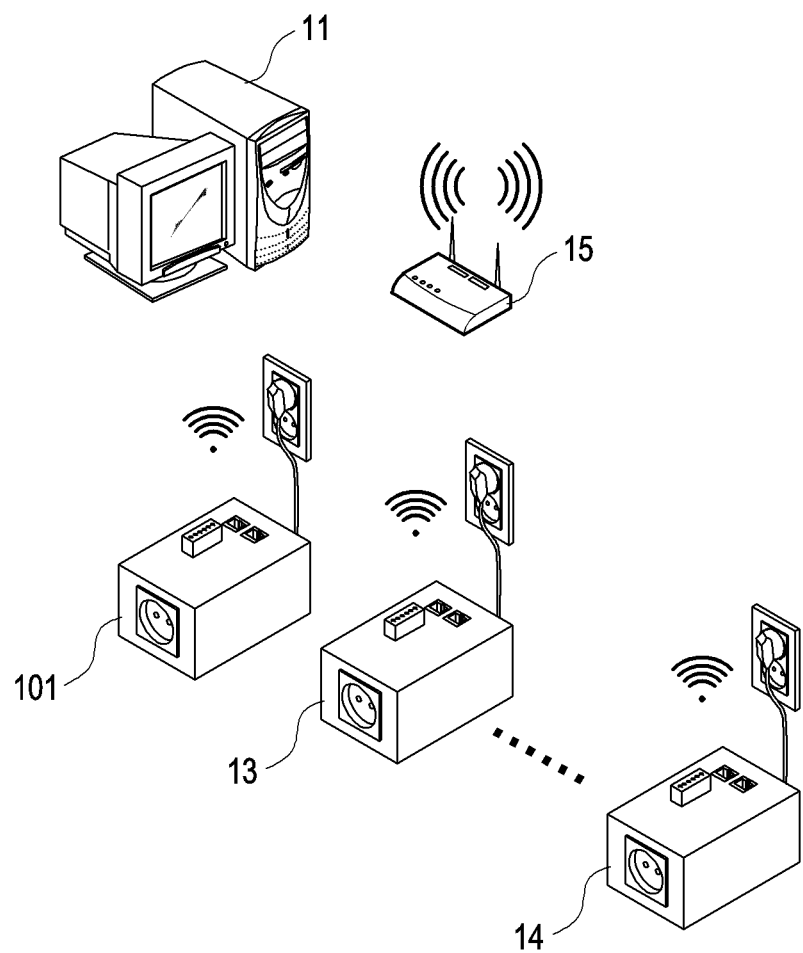

Referring to FIG. 1E, the system control device 11 and the electronic devices 101, 13, and 14 according to various embodiments may wirelessly transmit or receive data via the access point 15. A communication scheme supported by the access point 15 may be, for example, a WiFi scheme, but there is no limit to the communication scheme. In this case, differently from FIG. 1C and FIG. 1D, data transmission or reception between the system control device 11 and the electronic devices 101, 13, and 14 may be possible without relaying of the master module. If the communication scheme is WiFi, IP addresses may be assigned to the electronic devices 101, 13, and 14, respectively. In another example, each of the electronic devices 101, 13, and 14 may be implemented to support an ultra-high-speed communication environment which is 5G or higher. For example, each of the electronic devices 101, 13, and 14 may include a communication module for communication using an mmWave frequency band, and may transmit or receive data to or from the system control device 11 via 5G or 6G communication.

Preventing Damage from Inflow Current and Surge Voltage

The remaining Figures describe an electronic device 101 that prevents damage from inflow current and surge voltage to the external device 150*a*.

Figure 2A:
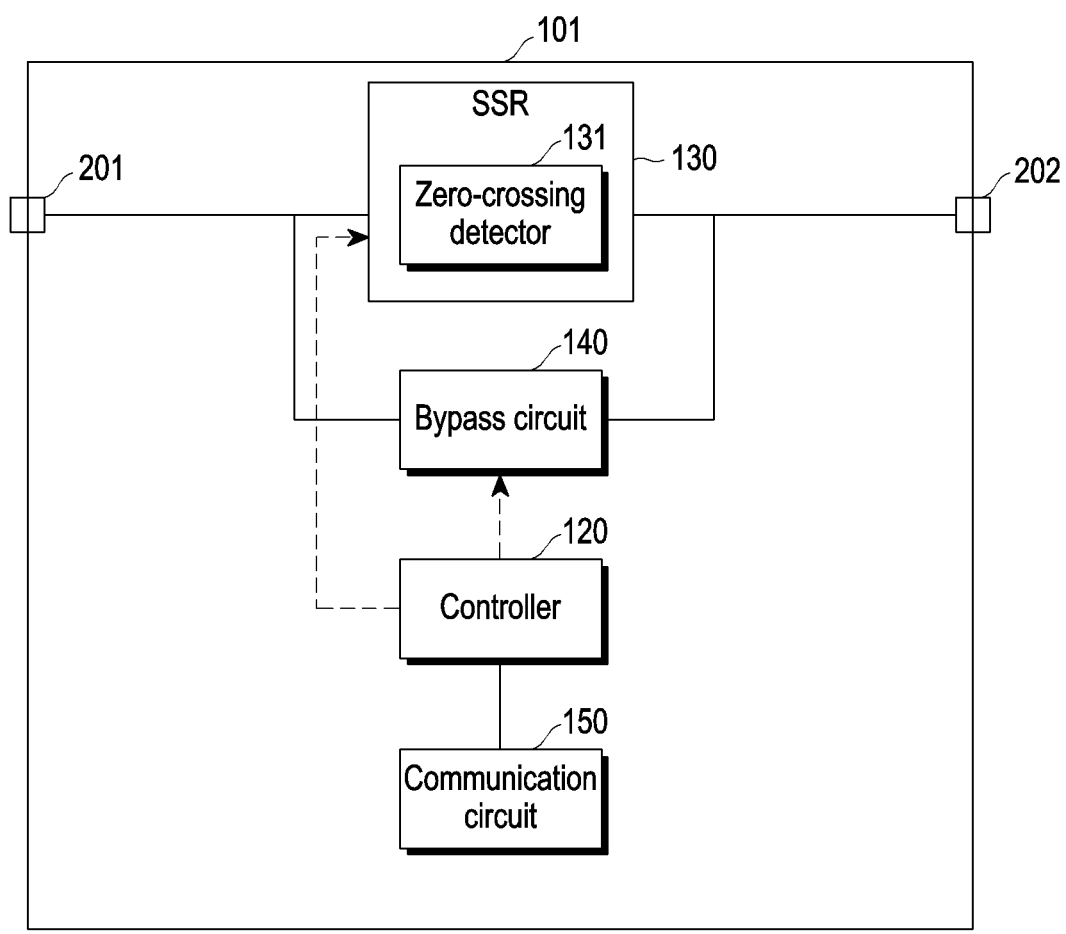
FIG. 2A is a block diagram of an electronic device according to various embodiments of the disclosure.

FIG. 2A is a block diagram of an electronic device according to various embodiments.

The electronic device 101 includes a solid state relay (SSR) 130 and a bypass circuit 140. When power to an external device 150*a* is started, the SSR 130 is turned on. The SSR 130 connects the input terminal 201 to the output terminal 202 when the voltage at input terminal 201 is substantially 0V. For example, when the power signal is an AC signal, the SSR 130 connects the input terminal 201 to the output terminal 202 when the instantaneous value of AC signal is substantially 0. This avoids inflow current damage. The bypass circuit 140 is turned a period of time after turning on the SSR 130. The bypass circuit 140, when on, connects between the input terminal 201 and the output terminal 202. Thus, when the bypass circuit 140 is on, power received at input terminal 201 is provided to output terminal 202 and an external device 150*a* connected thereto. After a period of time after turning on the bypass circuit 140, the SSR 130 is turned off When the electronic device 101 receives a signal to interrupt the power supply, the SSR is turned on and the bypass circuit 140 is turned off after a period of time. The SSR selectively opens a connection of the input terminal 201 to the output terminal 202 when the voltage at the input terminal 201 is substantially 0V. As a result, the input terminal 201 and the output terminal 202 are disconnected when there will be a low voltage drop. As a result, the electronic device 101 prevents damage from surge voltage to the external device 150*c*.

According to various embodiments, the electronic device 101 may include at least one of an input terminal 201, an output terminal 202, an SSR switch 130, a bypass circuit 140, or a controller 120. The input terminal may correspond to the first power interface 1*a*, 1*b*. The output terminal 202 may correspond to the second power interface 6*a*, 6*b*.

According to various embodiments, the input terminal 201 shall also be understood to include a contact point between the first power interface 1*a* or 1*b* and at least a part of an internal element (e.g., the SSR switch 130 and/or the bypass circuit 140) of the electronic device 101.

As described with reference to FIG. 1A or FIG. 1B, power having single-phase voltage or three-phase voltage from the power source 2a or 2b may be received via the input terminal 201 and transmitted. The output terminal 202 may be, for example, at least a part of the second power interface 6a or 6b illustrated in FIG. 1A or FIG. 1B, or may indicate a contact point between the second power interface 6a or 6b and at least a part of an element of the electronic device 101 including the SSR switch 130 and/or the bypass circuit 140. As described with reference to FIG. 1A or FIG. 1B, power having single-phase voltage or three-phase voltage received from the power source 2a or 2b may be transferred to the external device 150a or 150b via the output terminal 201.

According to various embodiments, the solid state relay (SSR) 130 may be turned on or turned off according to a control of the controller 120. In an embodiment, the SSR 130 may include a zero-crossing detector 131. The zero-crossing detector 131 may detect whether the voltage (or the voltage of at least one point, which is proportional to either) of the input terminal 201 and/or the output terminal 202 is substantially 0V (e.g., the voltage is included in the range between +a V and −a V, both inclusive, or the voltage is 0V). When the voltage of a detected point is substantially 0V, the input terminal 201 and the output terminal 202 may be connected to each other via the SSR 130.

For example, while the voltage of the detected point is increasing from a negative voltage to 0V in an AC waveform, the input terminal 201 and the output terminal 202 may not be connected before the voltage becomes substantially 0V, and may be connected when the voltage becomes substantially 0V. The SSR 130 may include, for example, a photocoupler and/or a triac, and these will be described with reference to FIG. 4.

According to various embodiments, the controller 120 may receive a power supply command from the system control device 11 via a communication circuit 150. For example, the communication circuit 150 may receive data of a power supply command from the system control device via a communication antenna (not illustrated) wirelessly as described with reference to FIG. 1E, or via a communication interface (e.g., the first communication interface 3a in FIG. 1A). The communication circuit 150 may receive data of a power supply command, based on relaying of the master module 12 as described with reference to FIG. 1C or FIG. 1D, or may directly receive data from the system control device 11 as described with reference to FIG. 1E. The communication circuit 150 may transfer the received power supply command to the controller 120. In another example, the electronic device 101 may include a manual switch, and power supply and/or interruption of power supply may be controlled according to a manipulation of the manual switch. For example, in an emergency situation, a user may directly manipulate the manual switch to interrupt power supply. Alternatively, in a situation such as communication error, a user may directly manipulate the manual switch to start power supply.

According to various embodiments, the controller 120 may provide, based on the power supply command, a signal to the SSR 130 for turning it on. When the signal for turning on is received, the SSR 130 may connect the input terminal 201 and the output terminal 202, based on the voltage of the detected point becoming substantially 0V.

If there is no SSR 130, at a time point at which the current from the source 2a or 2b has a relatively high value (e.g., a peak value), the current having the relatively high value would be immediately applied to the electronic device 101 and/or an equipment (e.g., the external device 150a or the external device 150b in FIG. 1A or FIG. 1B) connected to the electronic device 101, and a damage to the electronic device 101 and/or the equipment can occur due to inrush current.

Power can be supplied by the SSR 130 to the equipment via the output terminal 202 from a time point of being substantially 0V. Therefore, a damage to the electronic device 101 and/or the equipment due to inrush current may prevent or become less likely to occur. The SSR 130 may be turned on/off by an element implemented by a semiconductor included therein. The semiconductor may be, for example, an LED, a photodiode, and/or a triac. The SSR can thus have a fast response speed compared to the bypass circuit 140 which is turned on/off by a magnetic field applied to a coil. Therefore, power supply from a zero-crossing part may be possible. The controller 120 may be implemented as at least one of a processor, a mini computer, an FPGA, an MCU, or a DSP, but a person skilled in the art may understand that there is no limit to the type thereof if the controller can transmit or receive data to or from the communication circuit 150, can perform data processing, and/or can control an element (e.g., the SSR 130 and/or the bypass circuit 140) of the electronic device 101.

According to various embodiments, the controller 120 may turn on the bypass circuit 140, based on the lapse of a first period (e.g., 20 ms) after turning on the SSR 130. The bypass circuit 140 may include, for example, a switch (e.g., a switch which is turned on/off according to a physical movement caused by a magnetic force from a coil) which physically moves according to an electrical signal control. The first period may be configured based on an alternating current (AC) frequency, but is not limited thereto. The bypass circuit 140 may have a response speed lower than the SSR 130. However, a larger current compared to the SSR 130 may be applied to the bypass circuit 140. Alternatively, the bypass circuit 140 may have a smaller voltage drop after current lapse therethrough compared to the SSR 130, may have a smaller leakage current compared to the SSR 130, may have a larger power consumption, and may have a smaller heat generation, compared to the SSR 130. Accordingly, it may be advantageous to use the SSR 130 at an initial time point at which power supply starts, and supply power via the bypass circuit 140 when power supply continue after turning off the SSR 130.

The controller 120 may turn off the SSR 130, based on the lapse of a second period (e.g., 20 ms) after turning on the bypass circuit 140. The second period may be configured based on an alternating current (AC) frequency, but is not limited thereto. Furthermore, the second period may be the same as or different from the first period. As described above, power may be supplied to the equipment from a zero-crossing time point, and thus inrush current damage at a power supply start point becomes prevented or less likely to occur.

According to various embodiments, the controller 120 may receive a power interruption command from the system control device 11 via the communication circuit 150. The system control device 11 may be, for example, a client PC. In a factory environment in which equipments are arranged, multiple equipments and a big data environment in which sensor data in each equipment is collected are required to be constructed. For example, establishment of an artificial intelligence model by machine leaning, based on big data, and/or an operation of an equipment, based on the established model, may be performed in an actual factory environment. Therefore, the system control device 11 may be implemented to include an artificial intelligence server. The system control device 11 may autonomously determine a power interruption situation, based on the big data environment and/or the established model, and transmit a power interruption command to the electronic device 101. For example, the electronic device 101 may receive a power interruption command from the system control device 11 while supplying power from the source to the equipment.

When the electronic device 101 receives the power interruption command, the bypass circuit 140 may be in a turned on state, and the SSR 130 may be in a turned off state. For example, the communication circuit 150 may receive data of a power interruption command from the system control device wirelessly as described with reference to FIG. 1E, or via a communication interface (e.g., the first communication interface 3a in FIG. 1A). The communication circuit 150 may receive data of a power interruption command, based on relaying of the master module 12 as described with reference to FIG. 1C or FIG. 1D, or may directly receive data from the system control device 11 as described with reference to FIG. 1E. The communication circuit 150 may transfer the received power interruption command to the controller 120.

According to various embodiments, the controller 120 may provide, based on the power interruption command, a signal for turning on the SSR 130 to the SSR 130. When the signal for turning on is received, the SSR 130 may connect the input terminal 201 and the output terminal 202, based on the voltage of the detected point becoming substantially 0V.

According to various embodiments, the controller 120 may turn off the bypass circuit 140 based on the lapse of a third period (e.g., 20 ms) after turning on the SSR 130. Turning off the bypass circuit 140 can mean disconnecting or opening the bypass circuit or causing no electrical short to bypass the SSR 130. The third period may be configured based on an AC frequency of power, but is not limited thereto, and may be configured to be the same as or different from the first period. The controller 120 may turn off the SSR 130, based on the lapse of a fourth period (e.g., 20 ms) after turning off the bypass circuit 140. The fourth period may be configured based on an AC frequency of power, but is not limited thereto, and may be configured to be the same as or different from the first period.

In a case where the voltage of a detected point detected by the zero-crossing detector is substantially 0V, the input terminal 201 and the output terminal 202 may be electrically open circuited to each other (e.g., the connection therebetween may be released). For example, while the voltage of the detected point is increasing from a negative voltage to 0V in an AC waveform, the connection between the input terminal 201 and the output terminal 202 may be maintained before the voltage becomes substantially 0V, and the input terminal 201 and the output terminal 202 may be electrically open circuited to each other when the voltage becomes substantially 0V. Accordingly, in a case where the voltage of the output terminal 202 is substantially 0V, power supply to the output terminal 202 may be stopped, surge voltage can be suppressed. If there is no SSR 130, when the voltage of the output terminal 202 has a relatively high value (e.g., a peak value), supplying the voltage having the relatively high value may be immediately interrupted, causing a relatively large voltage drop in an equipment (e.g., the external device 150a or the external device 150b in FIG. 1A or FIG. 1B). Accordingly, by stopping power supply can be stopped by the SSR 130 at a time point of being substantially 0V, damage from surge voltage is prevented or less likely. The SSR 130 may be turned on/off by a semiconductor included in the SSR 130, and thus can have a fast response speed compared to the bypass circuit 140 which is turned on/off according to a physical movement. Therefore, power supply from a zero-crossing part may be possible.

Figure 2B:
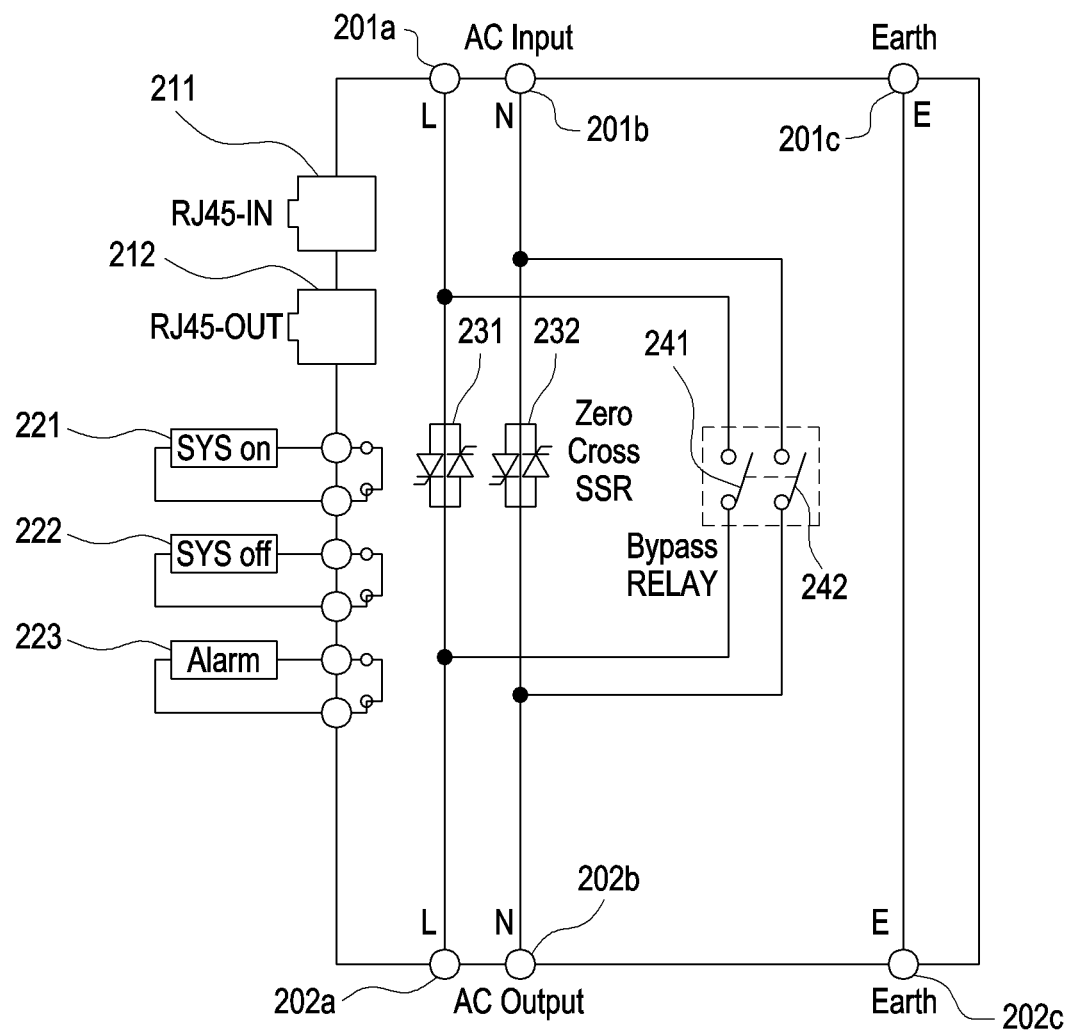
FIG. 2B is a diagram of an electronic device according to various embodiments of the disclosure.

FIG. 2B is a diagram of an electronic device according to various embodiments.

According to various embodiments, the electronic device 101 may include at least one of at least one input terminal 201a and 201b, at least one output terminal 202a and 202b, at least one earth terminal 201c and 202c, at least one communication interface 211 and 212, at least one signal input/output interface 221, 222, and 223, at least one triac 231 and 232, or at least one bypass switch 241 and 242. For example, in a case where the electronic device 101 supports the RS 485 communication protocol, the first communication interface 211 may be implemented as an RJ45-IN terminal, and the second communication interface 212 may be implemented as an RJ45-OUT terminal, but a supported communication scheme, and the implementation type of the communication interfaces 211 and 212 are not limited thereto. If the electronic device 101 supports wireless communication, the communication interfaces 211 and 212 may not be included in the electronic device 101.

According to various embodiments, the electronic device 101 in FIG. 2B may receive power having single-phase voltage, and supply the received power to an external device (e.g., the external device 150a in FIG. 1A). The electronic device 101 may include the first input terminal 201a and the first output terminal 202a for a line L, and the second input terminal 201b and the second output terminal 202b for a neutral line N. The line L may be connected to the first input terminal 201a and the first output terminal 202a, and the first triac 231 for selective connection of the first input terminal 201a and the first output terminal 202a may be connected to the line L. The neutral line N may be connected to the second input terminal 201b and the second output terminal 202b, and the second triac 232 for selective connection of the second input terminal 201b and the second output terminal 202b may be connected to the line N. Although not illustrated, the electronic device 101 may further include a photocoupler and/or a zero-crossing detector for applying a turn-on signal to a gate of the at least one triac 231 and 232, and these will be described with reference to FIG. 4. An earth line E may be connected between the at least one earth terminal 201c and 202c.

According to various embodiments, the first bypass switch 241 may be connected to the first input terminal 201a and the first output terminal 202a, and may be connected in parallel to the first triac 231. The second bypass switch 242 may be connected to the second input terminal 201b and the second output terminal 202b, and may be connected in parallel to the second triac 232. The at least one bypass switch 241 and 242 may be, for example, a physically moving switch, but the type thereof is not limited thereto.

Figure 2C:
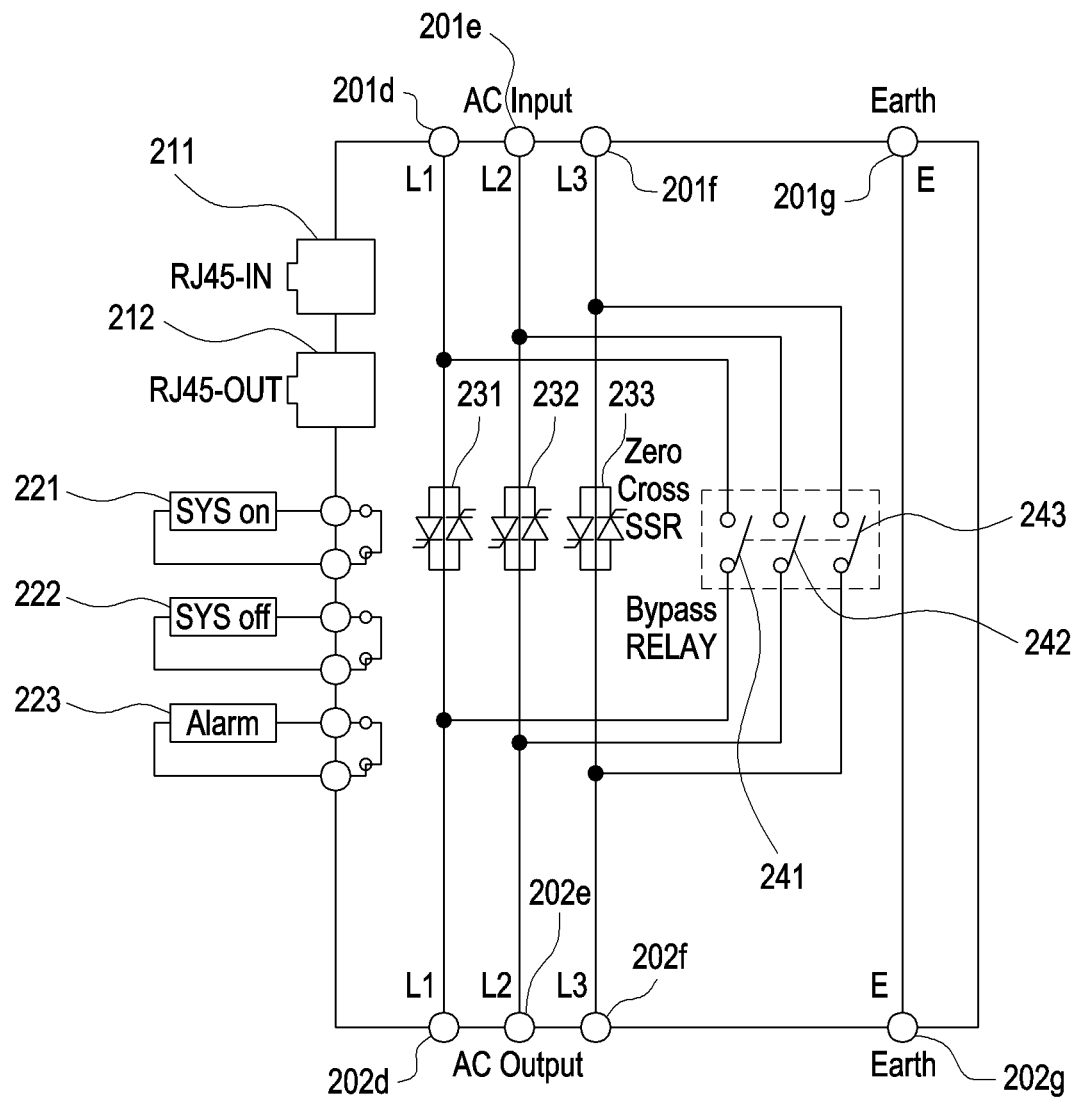
FIG. 2C is a diagram of an electronic device according to various embodiments of the disclosure.

FIG. 2C is a diagram of an electronic device according to various embodiments.

According to various embodiments, the electronic device 101 may include at least one of at least one input terminal 201d, 201e, and 201f, at least one output terminal 202d, 202e, and 202f, at least one earth terminal 201g and 202g, at least one communication interface 211 and 212, at least one signal input/output interface 221, 222, and 223, at least one triac 231, 232, and 233, or at least one bypass switch 241, 242, and 243. For example, in a case where the electronic device 101 supports the RS 485 communication protocol, the first communication interface 211 may be implemented as an RJ45-IN terminal, and the second communication interface 212 may be implemented as an RJ45-

OUT terminal, but a supported communication scheme, and the implementation type of the communication interfaces 211 and 212 are not limited thereto. If the electronic device 101 supports wireless communication, the communication interfaces 211 and 212 may not be included in the electronic device 101.

According to various embodiments, the electronic device 101 in FIG. 2C may receive power having three-phase voltage, and supply the received power to an external device (e.g., the external device 150a in FIG. 1A). The electronic device 101 may include the first input terminal 201d and the first output terminal 202d for a first line L1, the second input terminal 201e and the second output terminal 202e for a second line L2, and the third input terminal 201f and the third output terminal 202f for a third line L3. Powers having different phases may be supplied to the first line L1, the second line L2, and the third line L3, respectively. In an embodiment of FIG. 2C, a neutral line N is illustrated to be not included. However, this corresponds to an example, and a person skilled in the air may understand that the electronic device 101 includes a neutral line N, and can also transmit power having three-phase voltage in various examples. The first line L1 may be connected to the first input terminal 201d and the first output terminal 202d, and the first triac 231 for selective connection of the first input terminal 201d and the first output terminal 202d may be connected to the first line L1. The second line L2 may be connected to the second input terminal 201e and the second output terminal 202e, and the second triac 232 for selective connection of the second input terminal 201e and the second output terminal 202e may be connected to the second line L2. The third line L3 may be connected to the third input terminal 201f and the third output terminal 202f, and the third triac 233 for selective connection of the third input terminal 201f and the third output terminal 202f may be connected to the third line L3. Although not illustrated, the electronic device 101 may further include a photocoupler and/or a zero-crossing detector for applying a turn-on signal to a gate of the at least one triac 231, 232, and 233, and these will be described with reference to FIG. 4. An earth line E may be connected between the at least one earth terminal 201g and 202g.

According to various embodiments, the first bypass switch 241 may be connected to the first input terminal 201d and the first output terminal 202d, and may be connected in parallel to the first triac 231. The second bypass switch 242 may be connected to the second input terminal 201e and the second output terminal 202e, and may be connected in parallel to the second triac 232. The third bypass switch 243 may be connected to the third input terminal 201f and the third output terminal 202f, and may be connected in parallel to the third triac 233. The at least one bypass switch 241, 242, and 243 may be, for example, a switch which is turned on/off according to a movement, but the type thereof is not limited thereto.

Figure 3A:
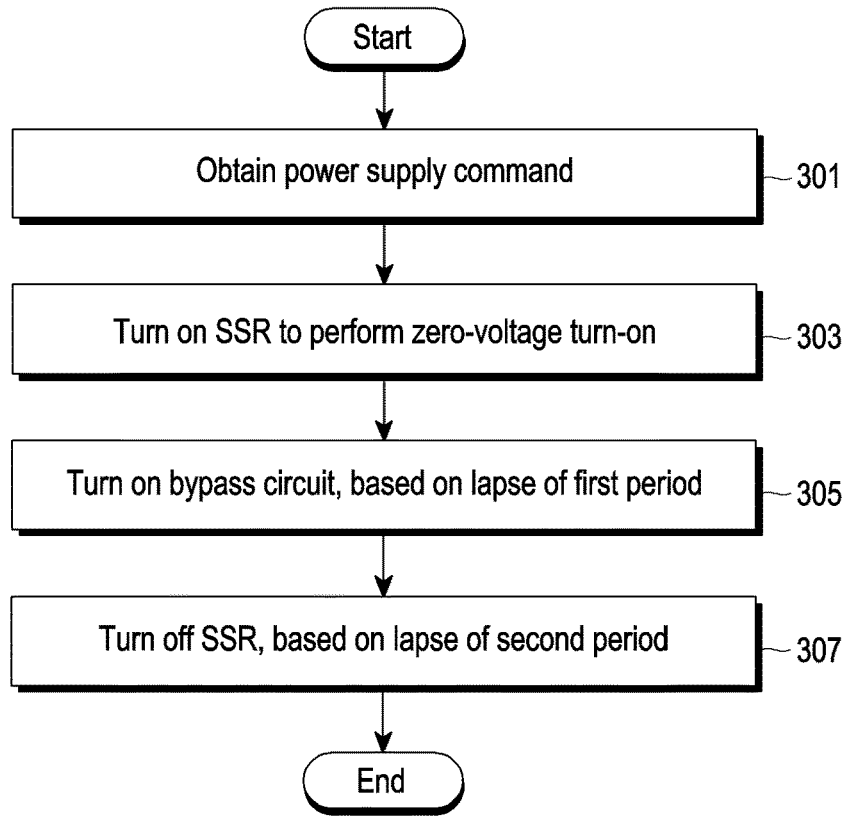
FIG. 3A is a flowchart illustrating an operation method of an electronic device according to various embodiments of the disclosure.
Figure 3B:
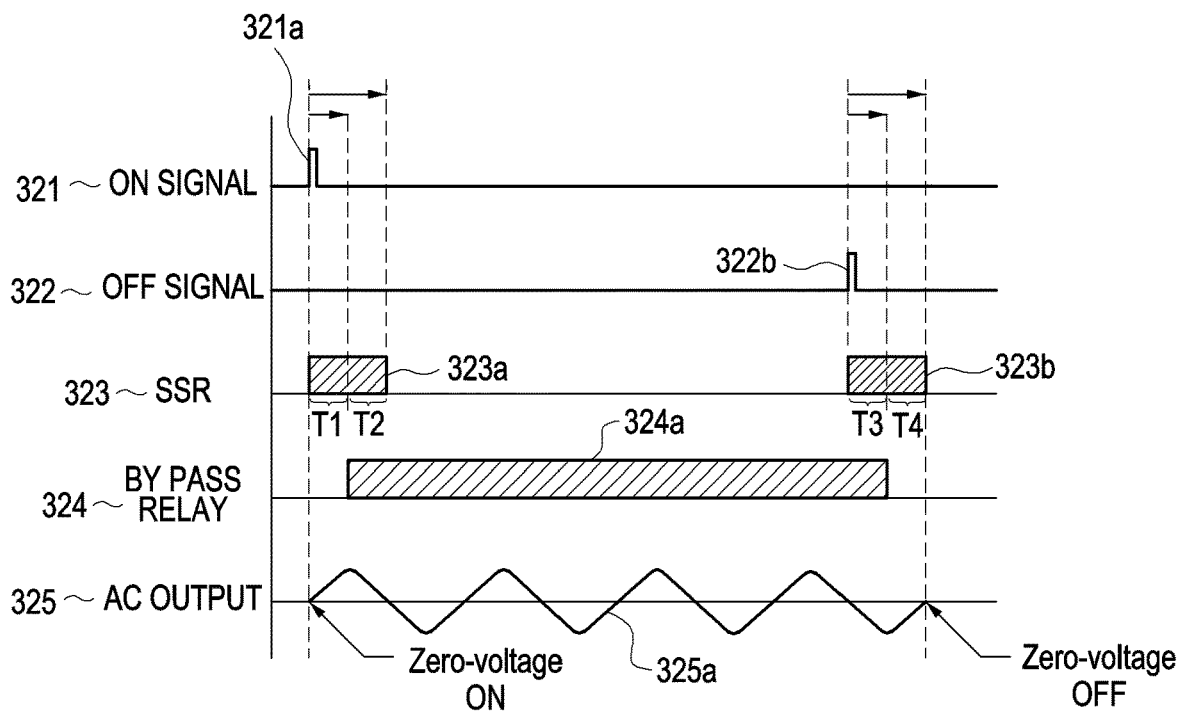
FIG. 3B illustrates waveforms of a signal according to various embodiments of the disclosure.

FIG. 3A is a flowchart illustrating an operation method of an electronic device according to various embodiments. An embodiment of FIG. 3A will be described with reference with FIG. 3B. FIG. 3B illustrates waveforms of a signal according to various embodiments.

According to various embodiments, the electronic device 101 (e.g., the controller 120) may obtain a power supply command in operation 301. For example, the electronic device 101 may receive a power supply command from a different electronic device connected by wire (e.g., at least one of the system control device 11, the master module 12, or the different electronic devices 13 and 14). For example, the electronic device 101 may receive a power supply command via the communication interfaces 211 and 212 as illustrated in FIG. 2B or FIG. 2C. Alternatively, the electronic device 101 may receive a power supply command from a different electronic device (e.g., at least one of the system control device 11, the master module 12, or the different electronic devices 13 and 14) via wireless communication.

According to various embodiments, the electronic device 101 may, in operation 303, turn on the SSR 130, based on the obtaining of the power supply command, so as to allow a zero-potential turn-on performed by the SSR 130 supplying power from a time point of being substantially 0V detected based on the zero-crossing detector 131. The zero-potential turn-on may imply power supply starting from a time point at which the voltage is substantially 0V, as described above. The SSR 130 may start power supply, based on detecting substantially 0V, based on the zero-crossing detector 131. For example, in a case where the electronic device 101 transmits power having single-phase voltage, the electronic device may turn on the triacs 231 and 232 in FIG. 2B. The triacs 231 and 232 may be turned on at a time point of being substantially 0V detected by the zero-crossing detector 131, and accordingly, power may be supplied, via an output terminal (e.g., the output terminal 202), to an equipment from the time point of being substantially 0V. Therefore, the occurrence of inrush current may be suppressed. For example, in a case where the electronic device 101 transmits power having three-phase voltage, the electronic device may turn on the triacs 231, 232, and 233 in FIG. 2C. For example, referring to a turn-on signal (ON SIGNAL) 321 in FIG. 3B, the controller 120 may obtain a first pulse signal 321a. Referring to an operation 323 of the SSR 130 in FIG. 3B, the controller 120 may turn on (323a) the SSR 310, based on the obtaining of the first pulse signal 321a. A period of turn-on 323a of the SSR 130 may indicate a period in which the controller 120 applies a signal (or a voltage) for turning on the SSR 130. If the SSR 130 is turned on, the SSR 130 may start power supply from a time point of being substantially 0V detected by the zero-crossing detector 131. Referring to a voltage 325 of the output terminal 202 in FIG. 3B, it may be noted that a voltage 325a is output by turn-on of the SSR 130 via the output terminal 202 from a point at which the voltage is substantially 0V. In FIG. 3B, the 0V voltage 325a is illustrated to be immediately output from a time point of turn-on of the SSR 130, but this corresponds to an example. In an example, if the period of turn-on 323a of the SSR 130 is a period in which the controller 120 provides a signal (or a voltage) for turn-on to the SSR 130, the voltage 325a having a delayed point of a substantially 0V after the period of turn-on 323a is started may be output. For example, as illustrated in FIG. 2B or FIG. 2C, the bi-directional triacs 231, 232, and 233 may be included in the electronic device 101, and the zero-crossing detector 131 may perform zero-crossing detection of bidirectional alternating current power. Accordingly, a relatively fast switch turn-on/off control based on a relatively fast response according to an alternating current phase may be possible. If the voltage of a detected point is not substantially 0V at a start point of the period of turn-on 323a, the voltage 325a may be output after waiting for the SSR 130 until the voltage of the detected point becomes substantially 0V, and a start time point of outputting the voltage 325a may be delayed than the start time point of turn-on 323a of the SSR 130.

According to various embodiments, the electronic device 101 may, in operation 305, turn on the bypass circuit 140, based on the lapse of a first period. Before the lapse of the first period, a zero-potential turn-on may be performed. For example, referring to an operation 324 of the bypass circuit 140 (BYPASS RELAY) in FIG. 3B, the bypass circuit 140 may be turned on (324a) based on the lapse of a first period T1 after the time point of turn-on of the SSR 130. For example, the electronic device 101 may turn on (324a) the bypass circuit 140 after the first period T1 from a time point at which the controller 120 applies a signal (or a voltage) for turn-on to the SSR 130, or after the first period T1 from a time point at which triacs (at least one of the triacs 231, 232, and 233) of the SSR 130 are turned on. The electronic device 101 may, in operation 307, turn off the SSR 130, based on the lapse of a second period after the turn-on 324a of the bypass circuit 140. Referring to the operation 323 of the SSR 130 in FIG. 3B, the SSR 130 may be turned off based on the lapse of the second period T2 after the turn-on 324a of the bypass circuit 140. As described above, the voltage 325a may be output via the output terminal 202 from a time point of being substantially 0V, and thus a possibility that inrush current is applied to an equipment (e.g., the external device 150a) connected to the electronic device 101 may be reduced.

Figure 3C:
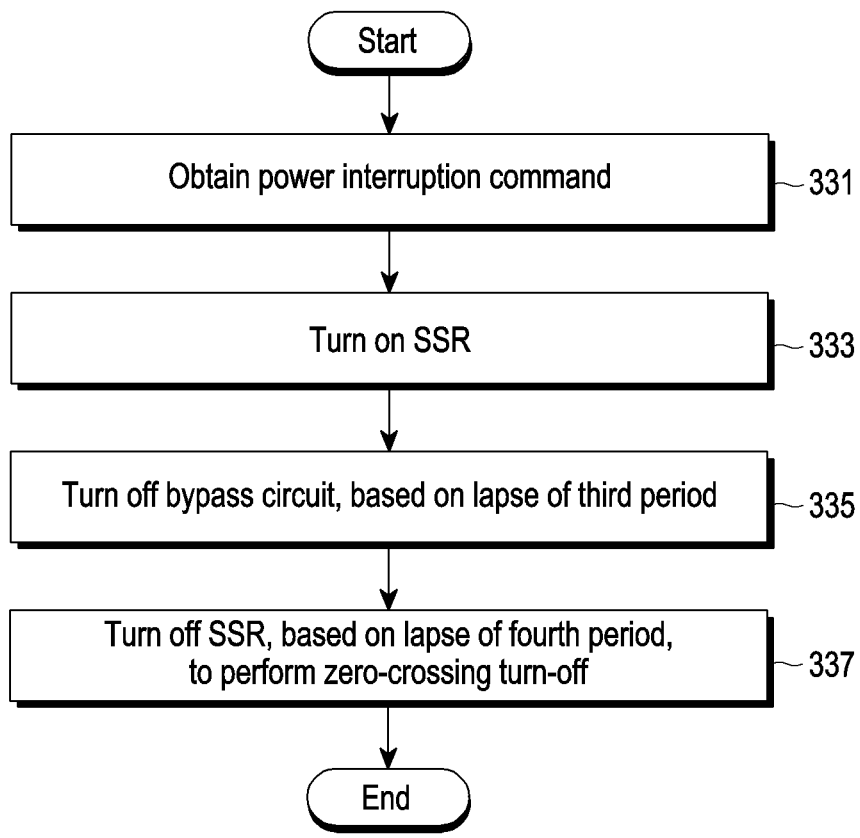
FIG. 3C is a flowchart illustrating an operation method of an electronic device according to various embodiments of the disclosure.

FIG. 3C is a flowchart illustrating an operation method of an electronic device according to various embodiments. An embodiment of FIG. 3C will be described with reference with FIG. 3B.

According to various embodiments, the electronic device 101 (e.g., the controller 120) may obtain a power interruption command in operation 331. For example, the electronic device 101 may receive a power interruption command from a different electronic device connected by wire (e.g., at least one of the system control device 11, the master module 12, or the different electronic devices 13 and 14). For example, the electronic device 101 may receive a power interruption command via the communication interfaces 211 and 212 as illustrated in FIG. 2B or FIG. 2C. Alternatively, the electronic device 101 may receive a power interruption command from a different electronic device (e.g., at least one of the system control device 11, the master module 12, or the different electronic devices 13 and 14) via wireless communication. Power is already being supplied to the equipment. Therefore, the electronic device 101 may obtain a power interruption command while the bypass circuit 140 is turned on and the SSR 130 is turned off According to various embodiments, the electronic device 101 may, in operation 333, turn on an SSR (e.g., the SSR 130 in FIG. 2A), based on the obtaining of the power interruption command. For example, in a case where the electronic device 101 transmits power having single-phase voltage, the electronic device may turn on the triacs 231 and 232 in FIG. 2B. For example, in a case where the electronic device 101 transmits power having three-phase voltage, the electronic device may turn on the triacs 231, 232, and 233 in FIG. 2C. For example, referring to the turn-on signal (ON SIGNAL) 321 in FIG. 3B, the controller 120 may obtain a second pulse signal 322b. Referring to the operation 323 of the SSR 130 in FIG. 3B, the controller 120 may turn on (323b) the SSR 310, based on the obtaining of the second pulse signal 322b. A period of the turn-on 323b of the SSR 130 may indicate a period in which the controller 120 applies a signal (or a voltage) for turning on the SSR 130, or may indicate a period in which triacs (at least one of the triacs 231, 232, and 233) of the SSR 130 are turned on.

According to various embodiments, the electronic device 101 may, in operation 335, turn off the bypass circuit 140, based on the lapse of a third period. For example, referring to the operation 324 of the bypass circuit 140 (BYPASS RELAY) in FIG. 3B, the bypass circuit 140 may be turned off based on the lapse of a third period T3 after the time point of turn-on of the SSR 130. For example, the electronic device 101 may turn off the bypass circuit 140 after the third period T3 from a time point at which the controller 120 applies a signal (or a voltage) for turn-on to the SSR 130, or after the third period T3 from a time point at which triacs (at least one of the triacs 231, 232, and 233) of the SSR 130 are turned on. The electronic device 101 may, in operation 337, turn off the SSR 130, based on the lapse of a fourth period after turn-off of the bypass circuit 140. Referring to the operation 323 of the SSR 130 in FIG. 3B, the SSR 130 may be turned off based on the lapse of the fourth period T4 after the turn-off of the bypass circuit 140, so that a zero-potential turn-off can be performed. For example, the triacs 231 and 232 may be turned off at a time point of being substantially 0V detected by the zero-crossing detector 131 before complete lapse of the fourth period T4, and accordingly, power supply may be interrupted via an output terminal (e.g., the output terminal 202) at the time point of being substantially 0V. Therefore, the occurrence of surge voltage may be suppressed. The SSR 130 may interrupt power supply, based on detection that the voltage is substantially 0V based on the zero-crossing detector 131, and accordingly, a zero-potential turn-off may be performed. In FIG. 3B, the voltage 325a of the output terminal 202 is illustrated to be substantially 0V at the time point at which the turn-on 323b of the SSR 130 is ended, but this merely corresponds to an example. For example, after a time point at which the bypass circuit 140 is turned off (e.g., based on the lapse of the third period T3), the supplying the voltage 325a may be stopped at any time points if the voltage is substantially 0V. As described above, power supply via the output terminal 202 may be stopped from a time point at which the voltage 325a is substantially 0V, and thus a possibility that inrush voltage may occur in an equipment (e.g., the external device 150a) connected to the electronic device 101 may be reduced.

Figure 4:
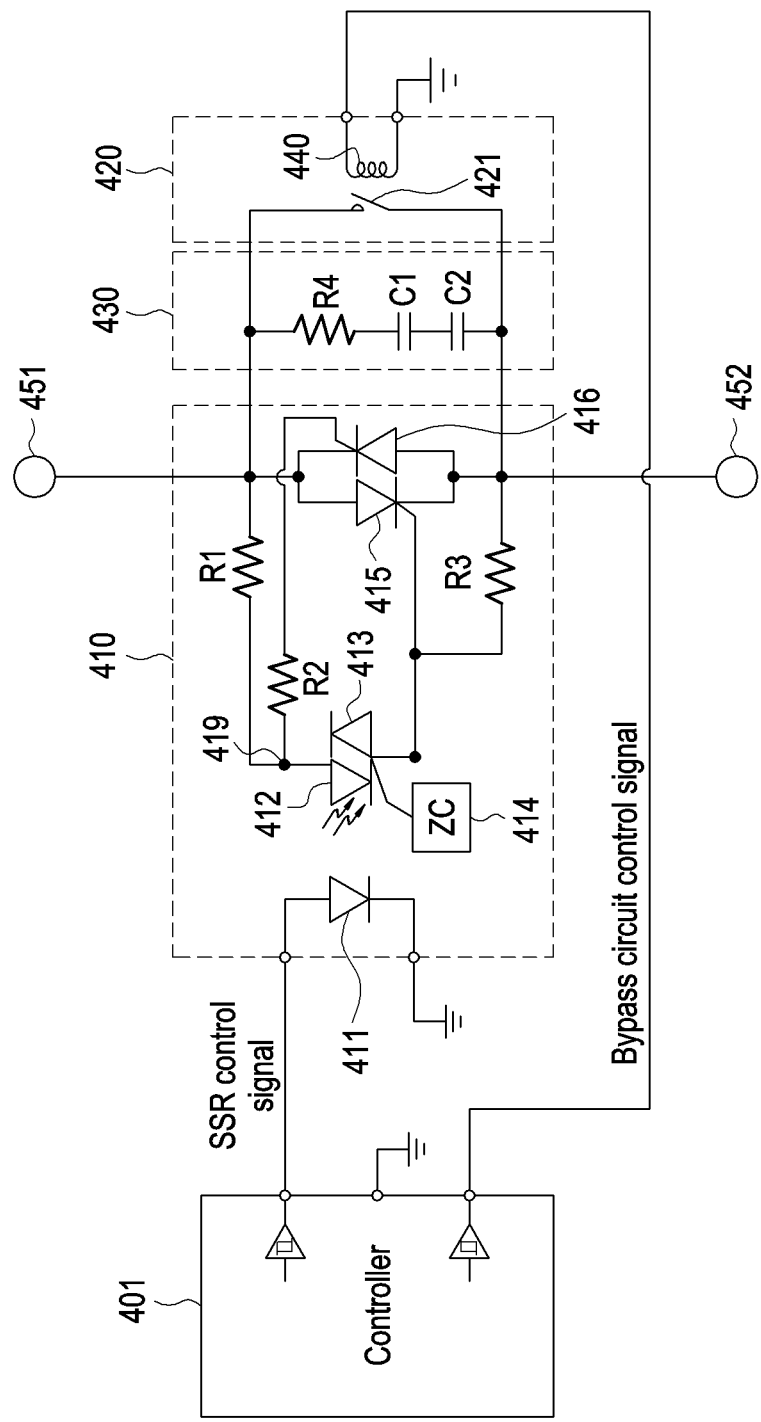
FIG. 4 is a diagram of an electronic device according to various embodiments of the disclosure.

FIG. 4 is a diagram of an electronic device according to various embodiments. In FIG. 4, a controller 401 can, in response to commands to start power or interrupt power, turn on/off the SSR 410 and the bypass circuit 140.

According to various embodiments, a controller 401 (e.g., the controller 120 in FIG. 2A) may control an SSR 410 (e.g., the SSR 130 in FIG. 2A) and/or a bypass circuit 420 (e.g., the bypass circuit 140 in FIG. 2A). For example, the controller 401 may provide an SSR control signal to the SSR 410, and/or may provide a bypass circuit control signal to the bypass circuit 420.

According to various embodiments, the SSR 410 may include at least one of a light emitting diode 411, photodiodes 412 and 413, a zero-crossing detector 414, triacs 415 and 416, or resistors R1, R2, and R3. When an SSR control signal is input from the controller 401, the light emitting diode 411 may emit light. The photodiodes 412 and 413 may receive light from the light emitting diode 411. The light emitting diode 411 and the photodiodes 412 and 413 may be called a photocoupler. By the photocoupler, the controller 401 may be physically or electrically separated from the SSR 410, and thus a damage from the SSR 410 can be prevented from affecting the controller 401.

The zero-crossing detector 414 may measure the voltage of a detected point (e.g., a point 419 in FIG. 4), but there is no limit to the position of the detected point. In a case where at least one of the photodiodes 412 and 413 is turned on by light reception, and the voltage of the detected point measured by the zero-crossing detector 414 is substantially 0V, a signal for turn-on may be provided to a gate of the triacs 415 and 416, and the triacs 415 and 416 may be turned on. The controller 401 may stop applying the SSR control signal, whereby the SSR 410 (e.g., triacs 415 and 416) may be turned off.

According to various embodiments, the controller 401 may control to turn on a switch 421 of the bypass circuit 420. For example, the electronic device 101 may include a coil 440 for controlling turn-on and turn-off of the bypass circuit 420. The controller 401 may apply a bypass circuit control signal to the coil 440, and the coil 440 may emit a magnetic field, based on the bypass circuit control signal. The switch 421 may be turned on by the magnetic field. If the application of the bypass circuit control signal is stopped, the switch 421 may be turned off. By a control according to the coil 440, the controller 401 may be physically or electrically separated from the bypass circuit 420, and thus a damage from the bypass circuit 420 can be prevented from affecting the controller 401.

According to various embodiments, the electronic device 101 may include a snubber circuit 430. The snubber circuit 430 may be, for example, connected in parallel to the bypass circuit 420, but there is no limit to the connection configuration. The snubber circuit 430 may include, for example, a resistor R4 and/or at least one capacitor C1 and C2, but there is no limit to the elements included in the snubber circuit 430. Power can be controlled by the zero-crossing detector to be supplied to an equipment from a time point of being substantially 0V, or to be interrupted at a time point of being substantially 0V. However, voltage surge and/or inrush current can occur, and in order to additionally compensate the problem, the snubber circuit 430 may be connected to the bypass relay 420. Voltage may be additionally dropped due to impedance caused by the snubber circuit 430, and thus a possibility of occurrence of surge voltage and/or inrush current can be further lowered.

According to various embodiments, in a case where the controller 401 obtains a power supply command, the controller may output an SSR control signal. The SSR 410 (e.g., the triacs 415 and 416) may be turned on based on the SSR control signal. The controller 401 may output a bypass circuit control signal, based on the lapse of a first period after a time point of turning on the SSR 140 (e.g., a time point of outputting the SSR control signal, or a time point at which at least a part of the triacs 415 and 416 is turned on). The coil 440 may generate a magnetic flux, based on the bypass circuit control signal, and the switch 421 may be turned on by the magnetic flux. The controller 401 may output a signal for turning off the SSR 410 or stop outputting the SSR control signal, based on the lapse of a second period from a time point at which the bypass circuit 420 (e.g., the switch 421) is turned on (e.g., a time point of outputting the bypass circuit control signal, or a time point at which the switch 421 is turned on).

According to various embodiments, in a case where the controller 401 obtains a power interruption command, the controller may output an SSR control signal. The turn-on state of the switch 421 may be maintained. The SSR 410 (e.g., the triacs 415 and 416) may be turned on based on the SSR control signal. The controller 401 may stop outputting the bypass circuit control signal, based on the lapse of a third period after a time point of turning on the SSR 140 (e.g., a time point of outputting the SSR control signal, or a time point at which at least a part of the triacs 415 and 416 is turned on). The switch 421 may be turned off, based on stop of output of the bypass circuit control signal. The controller 401 may output a signal for turning off the SSR 410 or stop outputting the SSR control signal, based on the lapse of a fourth period from a time point at which the bypass circuit 420 (e.g., the switch 421) is turned off (e.g., a time point of outputting the bypass circuit control signal, or a time point at which the switch 421 is turned on).

Figure 5:
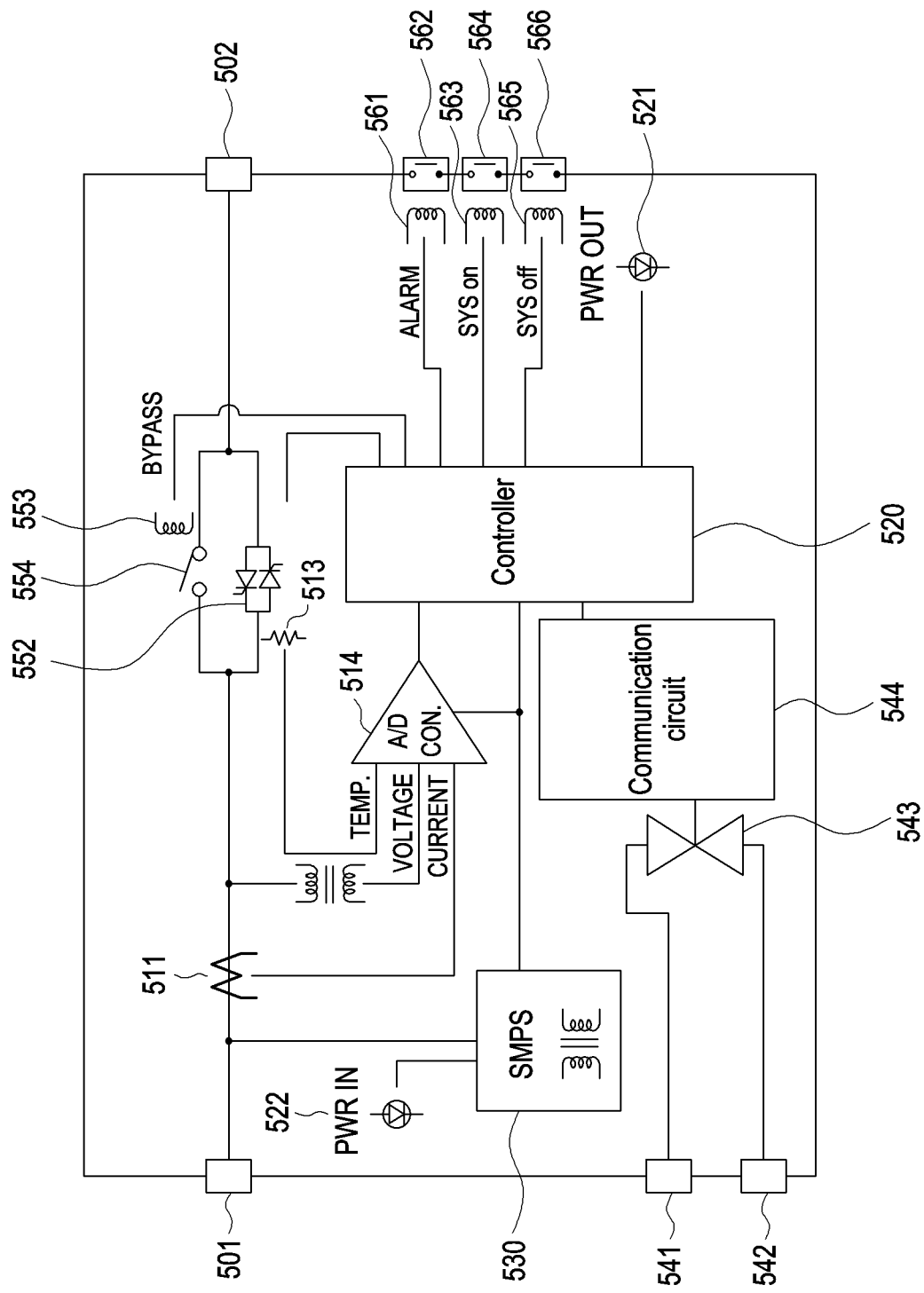
FIG. 5 is a diagram of an electronic device according to various embodiments of the disclosure.

FIG. 5 is a diagram of an electronic device according to various embodiments.

According to various embodiments, the electronic device 101 may include at least one of an input terminal 501, an output terminal 502, a current sensor 511, a voltage sensor 512, a temperature sensor 513, an A/D converter 514, a controller 520, at least one LED 521 and 522, a switching mode power supply (SMPS) 530, communication interfaces 541 and 542, an RS 485 interface 543, a communication circuit 544, a triac 552, a coil 553, a switch 554, trigger coils 561, 563, and 565, or signal input/output interfaces 562, 564, and 566.

According to various embodiments, the current sensor 511 may sense a current size (CURRENT) flowing through the input terminal 501. The voltage sensor 512 may sense a size of a voltage (VOLTAGE) applied to the input terminal 501. The temperature sensor 101. The A/D converter 514 may convert a sensed analog signal into a digital sig or 513 may sense a temperature (TEMP.) of at least one point of the electronic device nal, and provide the digital signal to the controller 520. The controller 520 may perform an operation corresponding to the digital signal. In an example, the controller 520 may report sensed information to a system control device via the communication circuit 544. For example, the communication circuit 544 and/or the RS 485 interface 543 may convert received information to be in a form defined in supported communication, and provide the converted information to an external device via the at least one communication interface 541 and 542. If a communication scheme is RS 485, the RS 485 interface 543 may be the same model as ADM3065E, but is not limited thereto. Alternatively, the controller 520 may perform at least one of over voltage protection (OVP), over current protection (OCP), or over temperature protection (OTP) to correspond to the digital signal. When information from an external device is received via the at least one communication interface 541 and 542, the RS 485 interface 543, and the communication circuit 544, the controller 520 may perform an operation corresponding to the information. For example, the controller 520 may obtain a power supply command or a power interruption command, and may perform an operation described with reference to FIG. 3A to FIG. 3C to correspond to the obtained command.

According to various embodiments, the controller 520 may provide a turn-on signal to the alarm trigger coil 561, the system on trigger coil 563, and the system off trigger coil 565. When a turn-on signal is provided to at least one of the alarm trigger coil 561, the system on trigger coil 563, and the system off trigger coil 565, a trigger signal may be provided from at least one of the signal input/output interfaces 562, 564, and 566. The signal input/output interfaces 562, 564, and 566 may be connected to an equipment (e.g., the external device 150a), and a trigger signal may be provided to the equipment (e.g., the external device 150a) accordingly. The equipment (e.g., the external device 150a) may perform an alarm response operation, system on, or system off according to an alarm trigger signal, a system on trigger signal, or a system off trigger signal. Accordingly, the system control device may control power supply/interruption to the equipment (e.g., the external device 150a) via the electronic device 101, and also control an operation such as an alarm, system-on, or system-off. In another example, a manipulation command may be received via an input device included in the electronic device 101, and a trigger signal corresponding to the manipulation command may be provided to the equipment (e.g., the external device 150a).

According to various embodiments, the controller 520 may control turn-on/off of the switch 554 of the bypass circuit according to power supply/interruption relative to the coil 553. The controller 520 may control turn-on/off of the at least one triac 552. The LEDs 522 and 521 may emit light according to a control of the controller 520, and may allow a user to recognize an operation state of the electronic device 101.

According to various embodiments, the SMPS 530 may output direct current voltage by using a voltage input through the input terminal 501. The SMPS 530 may output a voltage having the same size (e.g., 12V), for example, with respect to an input voltage having any size. The controller 520 may output a voltage for controlling the SSR and the bypass circuit by using a voltage from the SMPS 530. For example, a voltage having a pre-configured size (e.g., 12V) may be required to control the coil 553. A voltage having the same size (e.g., 12V) may be supplied to the coil 553 by the SMPS 530. For example, the electronic device 101 may receive powers having various amount such as AC 110V, AC 220V, AC 380V, and AC 440V. If the SMPS 530 is not included in the electronic device 101, the electronic device 101 is required to include coils for turning on the switch 554 of the bypass circuit, which correspond to the powers having various sizes, respectively. A voltage having a single size (e.g., 12V) is supplied by the SMPS 530, whereby the electronic device 101 can control turn-on/off of the switch 554 of the bypass circuit by using only the one coil 553.

Figure 6A:
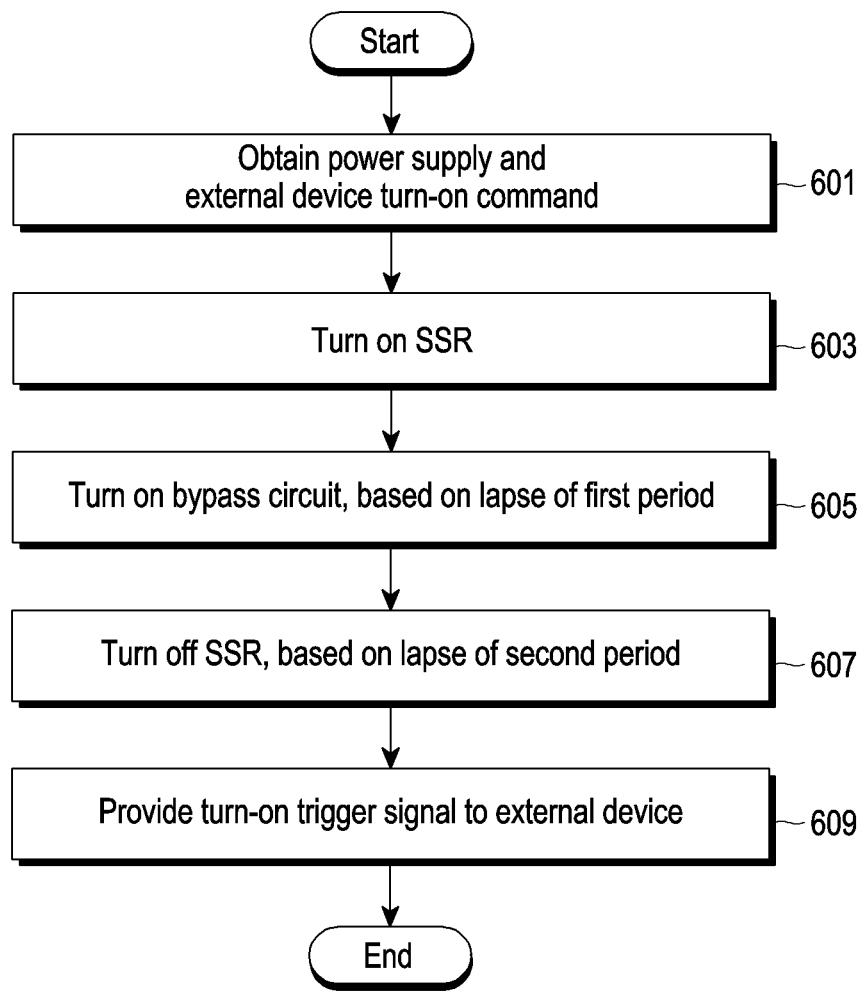
FIG. 6A is a flowchart illustrating an operation method of an electronic device according to various embodiments of the disclosure.

FIG. 6A is a flowchart illustrating an operation method of an electronic device according to various embodiments. Operations described with reference to FIG. 3A among embodiments of FIG. 6A will be briefly described.

According to various embodiments, the electronic device 101 (e.g., the controller 120) may obtain a power supply and external device turn-on command in operation 601. The electronic device 101 may receive one signal for the power supply and external device turn-on command, or may receive a signal for power supply and a signal for turn-on of an external device. In operation 603, the electronic device 101 may turn on the SSR 130. In operation 605, the electronic device 101 may turn on the bypass circuit 140, based on the lapse of a first period. In operation 607, the electronic device 101 may turn off the SSR 130, based on the lapse of a second period from a time point of turn-on of the bypass circuit 140.

It is noted that in various embodiments, operations 603-609 can be performed upon detecting connection of the external device 150a to the output terminal. The electronic device 101 can detect connection of the external device 150a to the output terminal by detecting a change in resistance at the output terminal.

According to various embodiments, the electronic device 101 may, in operation 609, turn off the SSR 130 and then provide a turn-on trigger signal to the external device. For example, the controller 120 may apply a signal for turn-on to the system on trigger coil 563 in FIG. 5. Accordingly, a trigger signal may be provided to the external device via the signal input/output interface 564, and the external device may perform a system turn-on operation, based on the trigger signal.

Figure 6B:
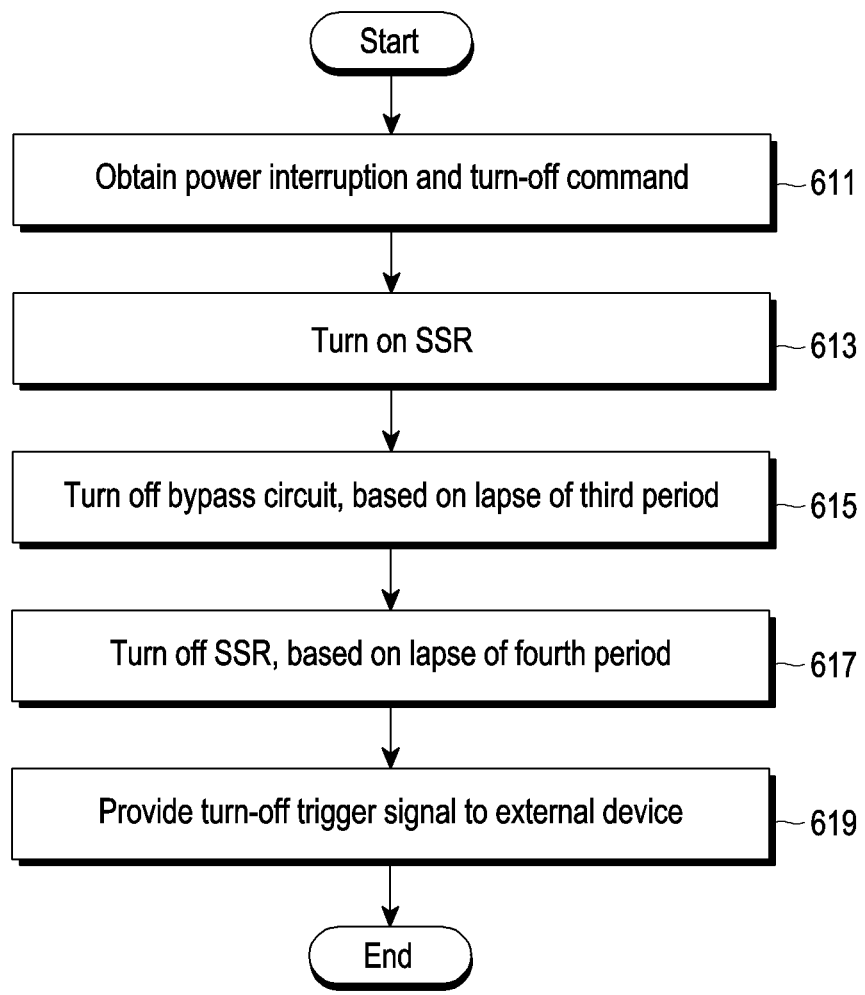
FIG. 6B is a flowchart illustrating an operation method of an electronic device according to various embodiments of the disclosure.

FIG. 6B is a flowchart illustrating an operation method of an electronic device according to various embodiments. Operations described with reference to FIG. 3C among embodiments of FIG. 6B will be briefly described.

According to various embodiments, the electronic device 101 (e.g., the controller 120) may obtain a power interruption and external device turn-off command in operation 611. The electronic device 101 may receive one signal for the power interruption and external device turn-off command, or may receive a signal for power interruption and a signal for turn-off of an external device. In operation 613, the electronic device 101 may turn on the SSR 130. In operation 615, the electronic device 101 may turn off the bypass circuit 140, based on the lapse of a third period. In operation 617, the electronic device 101 may turn off the SSR 130, based on the lapse of a fourth period from a time point of turn-off of the bypass circuit 140.

According to various embodiments, the electronic device 101 may, in operation 619, turn off the SSR 130 and then provide a turn-off trigger signal to the external device. For example, the controller 120 may apply a signal for turn-on to the system off trigger coil 565 in FIG. 5. Accordingly, a trigger signal may be provided to the external device via the signal input/output interface 566, and the external device may perform a system turn-off operation, based on the trigger signal.

According to various embodiments, the electronic device 101 may receive data for power supply as in Table 1.

TABLE 1

| ID | Function | High Addr | Low Addr | High Data | Low Data | High CRC | Low CRC |
|----|----------|-----------|----------|-----------|----------|----------|---------|
| 01 | 06 | 01 | 01 | 00 | 01 | CRC | CRC |

In Table 1, the ID field may be used as an address for communication of the electronic device 101. The Function field employs, for example, a form following a regulation of the Modbus protocol, and may indicate a function to be performed by the electronic device 101. For example, if a value in the Function field is 03, this may indicate a function of reading a function configuration value of the electronic device 101. For example, if a value in the Function field is 04, this may indicate a function of reading a current value, a voltage value, and a temperature value of the electronic device 101. For example, if a value in the Function field is 06, this may indicate a function of changing or controlling a function configuration value of the electronic device 101. The High Addr field and the Low Addr field may indicate an address number of a function to be controlled, and for example, the High Addr field and the Low Addr field may be configured by hexadecimal numbers. As in an example of Table 1, in a case where the values of the High Addr field and the Low Addr field are 01 and 01, these may indicate on/off of a power supply mode, which is a function having the address number 0X01. Alternatively, reading an analog state value (measurement value) or an event value, and reading of a memory value may be indicated by the High Addr field and the Low Addr field. The High Data field and the Low Data field may indicate data of a function to be changed, and for example, the High Data field and the Low Data field may be configured by hexadecimal numbers. As in the example of Table 1, in a case where the values of the High Data field and the Low Data field are 00 and 01, these may indicate ON, and if the values are 00 and 00, these may indicate OFF. The High CRC field and the Low CRC field may indicate a calculation code for identifying validity of communication data. For example, the example of Table 1 may indicate, as data for changing a configuration value of a slave device, the ID of which is 01, a purpose wherein a configuration value of a subject to be changed is a power supply mode, and a configuration value of the power supply mode is changed to ON, that is, the example may indicate a power supply command. If the values of the High Data field and the Low Data field are 00 and 00, these may indicate a power interruption command.

Figure 7A:
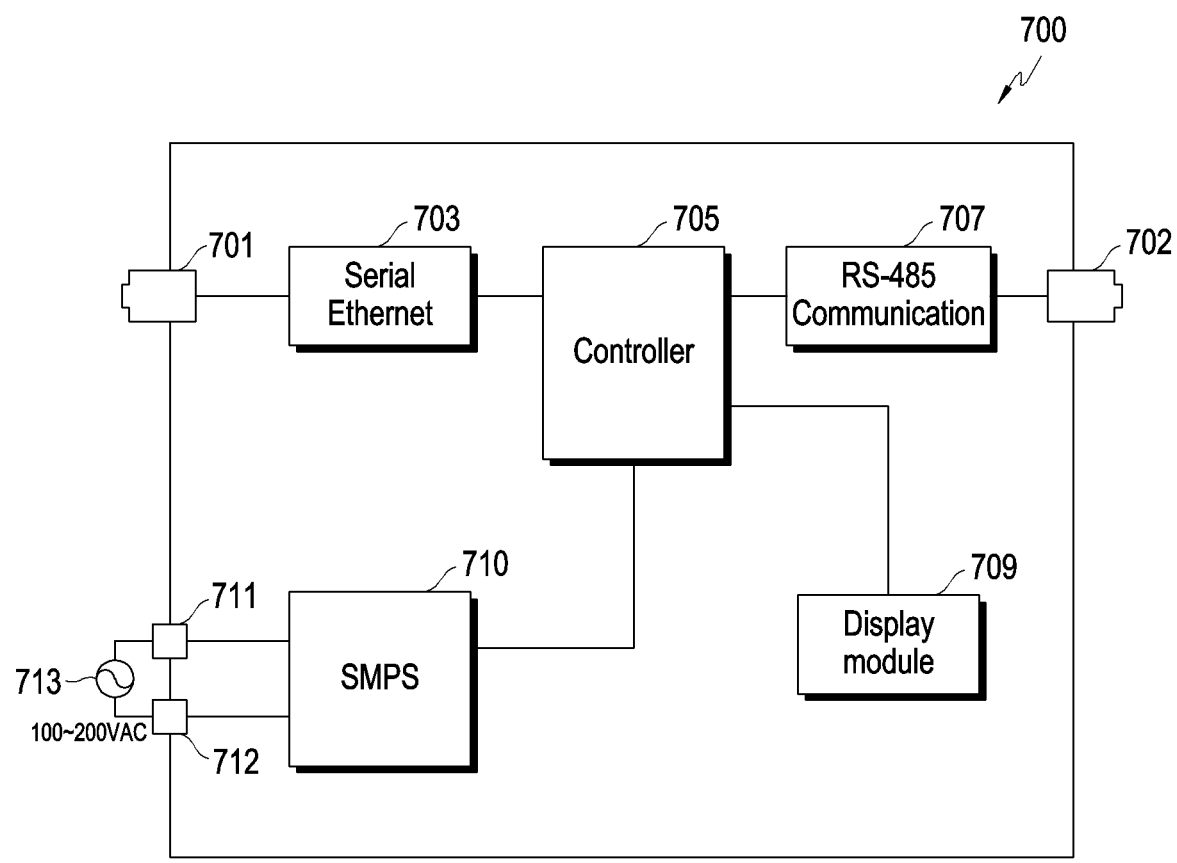
FIG. 7A is a block diagram of a master module according to various embodiments of the disclosure.
Figure 7B:
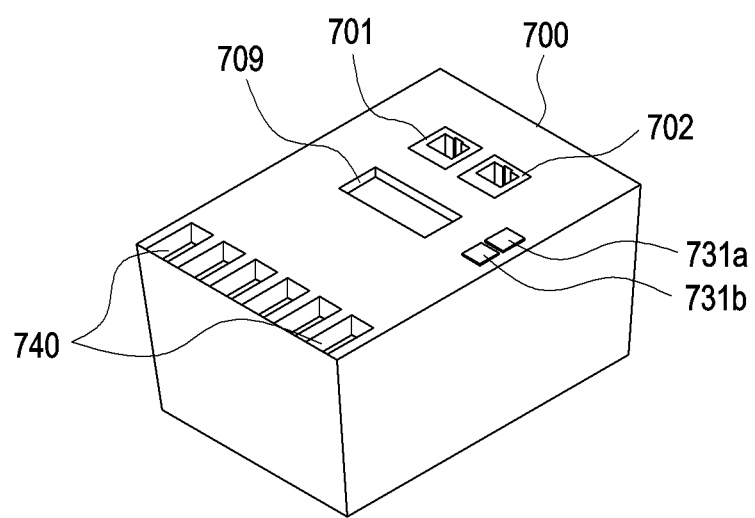
FIG. 7B is a diagram of a master module according to various embodiments of the disclosure.

FIG. 7A is a block diagram of a master module according to various embodiments. An embodiment of FIG. 7A will be described with reference with FIG. 7B. FIG. 7B is a diagram of a master module according to various embodiments.

According to various embodiments, a master module 700 may include at least one of at least one communication interface 701 and 702, at least one communication circuit 703 and 707, a controller 705, a display module 709, a switching mode power supply (SMPS) 710 or at least one power interface 711 and 712.

According to various embodiments, the first communication interface 701 may be implemented based on Ethernet. An Ethernet-based system control device may be connected to the first communication interface 701 by wire. The first communication interface 701 may be connected to the controller 705 via the serial Ethernet communication circuit 703. The serial Ethernet communication circuit 703 may process Ethernet-based data. The controller 705 may transmit or receive data to or from the system control device via the first communication interface 701 and the serial Ethernet communication circuit 703. The second communication interface 702 may be implemented by, for example, an RJ-45 for the RS 485 communication standard, but this merely corresponds to an example, and there is no limit to a supported communication scheme. The controller 705 may be connected to the second communication interface 702 via the RS-485 communication circuit 707. The RS-485 communication circuit 707 may process data based on the RS 485 communication protocol. The controller 705 may transmit or receive data to or from the electronic device 101 via the second communication interface 702 and the RS-485 communication circuit 707. The controller 705 may convert Ethernet-based data into data following the RS-485 communication protocol, or may convert data following the RS-485 communication protocol into Ethernet-based data. For example, as in FIG. 7B, the communication interfaces 701 and 702 are illustrated to be arranged on a first surface of a housing of the master module 700, but there is no limit to the position of the arrangement.

According to various embodiments, information relating to a current state of each of connected electronic devices may be displayed on the display module 709. The display module 709 may display an interface for a user manipulation. According to a manipulation via an interface, the controller 705 may provide data to a system control device or an electronic device. Alternatively, the master module 700 may include input devices 731a and 731b for control, and may process data processing according to a manipulation of the input devices 731a and 731b. The SMPS 710 may receive power from a power source 713 via the power interfaces 711 and 712. The SMPS 710 may output a rated direct current voltage for an operation of the controller 705 by using the received power. As illustrated in FIG. 7B, various auxiliary power terminals 740 may be arranged on the housing of the master module 700.

Figure 7C:
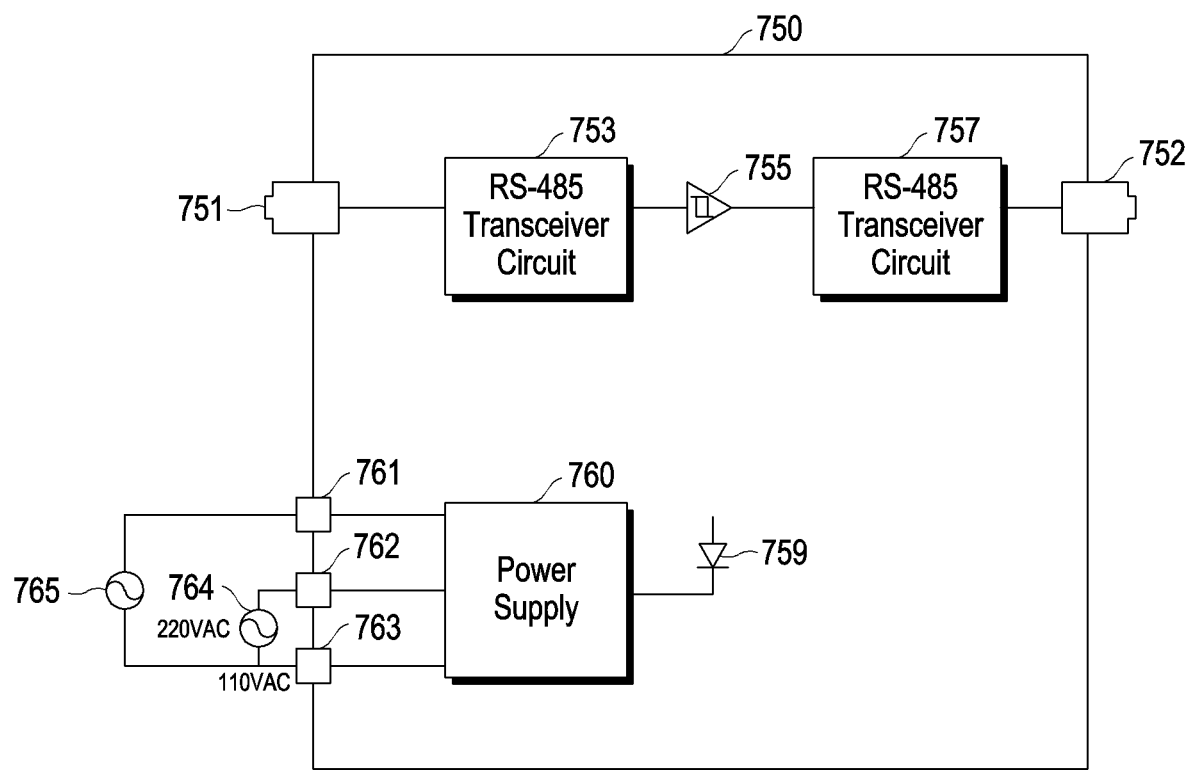
FIG. 7C is a block diagram of a repeater according to various embodiments of the disclosure.

FIG. 7C is a block diagram of a repeater according to various embodiments.

According to various embodiments, a repeater 750 may, for example, connect a master module and an electronic device, or connect electronic devices. The repeater 750 may include at least one of at least one communication interface 751 and 752, at least one communication circuit 753 and 757, a Schmitt trigger circuit 755, a power supply 760 or at least one power interface 761, 762 and 763.

According to various embodiments, the first communication interface 751 and the second communication interface 752 may be implemented by, for example, an RJ-45 for the RS 485 communication standard, but this merely corresponds to an example, and there is no limit to a supported communication scheme. The Schmitt trigger circuit 755 may be connected to the first communication interface 751 and the second communication interface 752 via the RS-485 communication circuits 753 and 757. The RS-485 communication circuits 753 and 757 may process data based on the RS-485 communication protocol. The Schmitt trigger circuit 755 may transmit or receive data to or from a system control device and/or an electronic device via the communication interfaces 751 and 752 and the RS-485 communication circuits 753 and 757. When an input signal having a designated value or higher is received, the Schmitt trigger circuit 755 may operate to provide an output signal. The power supply 760 may output a voltage for an operation of the RS-485 communication circuits 753 and 757 by using power received from at least a part of power sources 764 and 765 via at least a part of power interfaces 761, 762, and 763. An LED 759 may emit light by using a voltage received from the power supply 760, and accordingly, a user can recognize whether the repeater is currently in operation.

Figure 8:
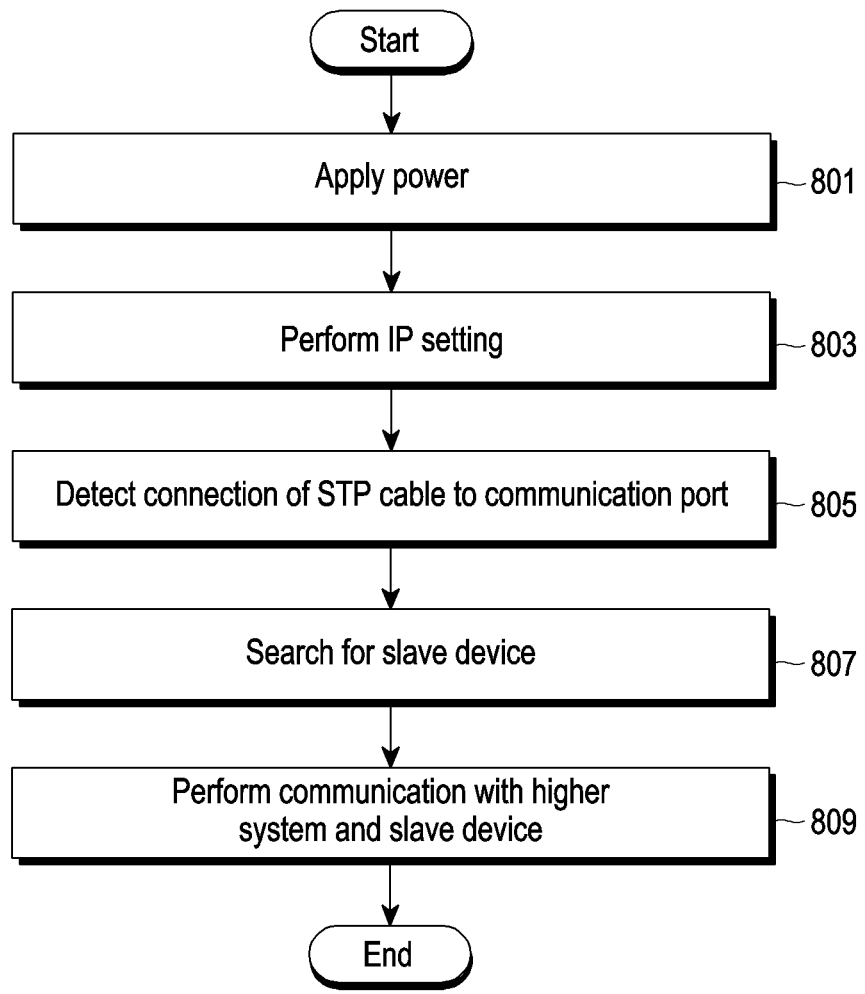
FIG. 8 is a flowchart illustrating an operation method of a master module according to various embodiments of the disclosure.

FIG. 8 is a flowchart illustrating an operation method of a master module according to various embodiments.

According to various embodiments, the master module 700 (e.g., the controller 705) may receive power applied thereto in operation 801. The master module 700 may perform IP setting in operation 803. As described above, the master module 700 may, for example, perform Ethernet-based communication with a system control device, and may perform IP setting (e.g., at least one operation for IP address assignment) accordingly.

According to various embodiments, the master module 700 may, in operation 805, detect that an STP cable is connected to a communication port. The master module 700 may, in operation 807, search for a slave device, based on detection of connection of the STP cable. When a slave device is found, the master module 700 may, in operation 809, perform communication with a higher system (e.g., the system control device) and the slave device. For example, the master module 700 may convert data from the higher system (e.g., the system control device) into data based on the RS-485 communication protocol, and provide the converted data to the slave device. Alternatively, the master module 700 may convert data based on the RS-485 communication protocol from the slave device into Ethernet-based data, and provide the converted data to the higher system (e.g., the system control device).

According to various embodiments, an electronic device (e.g., the electronic device 101) may include an input terminal (e.g., the input terminal 201) configured to receive an alternating current (AC) power from an external source, an output terminal (e.g., the output terminal 202) configured to output the AC power, a solid state relay (SSR) (e.g., the SSR 130) configured to selectively connect the input terminal and the output terminal, a bypass circuit (e.g., the bypass circuit 140) connected in parallel to the SSR and configured to selectively connect the input terminal and the output terminal, and a controller (e.g., the controller 120). The SSR may include a zero-crossing detector (e.g., the zero-crossing detector 414) configured to detect a zero voltage of a voltage associated with a voltage of at least one of the input terminal and/or the output terminal. The controller may be configured to obtain a power supply interruption command while supplying the AC power received via the input terminal to the output terminal via the bypass circuit, turn on the SSR, based on the obtaining of the power supply interruption command, turn off the bypass circuit, based on the lapse of a first period after turning on the SSR, and turn off the SSR, based on the lapse of a second period after turning off the bypass circuit, and the SSR is configured to stop outputting the AC power based on detecting, based on the zero-crossing detector, that the voltage becomes substantially 0V at the input terminal before the lapse of the second period after turning off the bypass circuit.

According to various embodiments, the SSR may include a light emitting diode (LED) (e.g., the LED 411) configured to emit light, based on a first signal from the controller, at least one photodiode (e.g., the photodiodes 412 and 413) configured to output a current according to the light from the LED, and at least one triac (e.g., the triacs 415 and 416) configured to be turned on, based on the detection of substantially 0V by the zero-crossing detector, and the output of the current from the at least one photodiode.

According to various embodiments, the controller may be configured to, as at least a part of the operation of turning on the SSR based on the obtaining of the power supply interruption command, output the current to the LED based on the obtaining of the power supply interruption command, wherein the LED may be configured to emit the light, based on the current, wherein the at least one photodiode may be configured to output the current, based on the light from the LED, and wherein the at least one triac may be configured to be turned on based on the current and a time point of the detection of the substantially 0V.

According to various embodiments, the controller may be configured to, as at least a part of the operation of turning off the SSR based on the lapse of the second period after turning off the bypass circuit, stop outputting the current to the LED, wherein the LED may be configured to stop emitting the light, based on the current, wherein the at least one photodiode may be configured to stop outputting the current, and wherein the at least one triac may be configured to be turned off According to various embodiments, the at least one triac may include at least one first triac connected between the input terminal and the output terminal in a first direction, and at least one two triac connected between the input terminal and the output terminal in a second direction opposite to the first direction.

According to various embodiments, the bypass circuit may include a coil and a switch (e.g., the switch 421) configured to be turned on based on a magnetic field from the coil, and the controller may be configured to, as at least a part of the operation of turning off the bypass circuit, stop providing a signal applied to the coil.

According to various embodiments, the electronic device may further include an switching mode power supply (SMPS) (e.g., the SMPS 530) configured to supply a direct current (DC) voltage having a designated value by using the AC power input from the input terminal, wherein the controller is configured to provide the signal for the coil by using the DC voltage received from the SMPS.

According to various embodiments, the controller may be configured to obtain a power supply command for the AC power before the AC power is supplied via the input terminal, turn on the SSR, based on the obtaining of the power supply command, turn on the bypass circuit, based on the lapse of a third period after turning on the SSR, and turn off the SSR, based on the lapse of a fourth period after turning on the bypass circuit.

According to various embodiments, the SSR may be configured to start outputting the AC power, based on detecting, based on the zero-crossing detector, that the voltage becomes substantially 0V before the lapse of the third period after turning on the SSR.

According to various embodiments, the electronic device may further include a snubber circuit (e.g., the snubber circuit 430) including at least one resistor and/or at least one capacitor, wherein the snubber circuit is connected in parallel to the bypass circuit and the SSR.

According to various embodiments, the electronic device may further include at least one communication interface configured to receive data from a system control device by wire, and/or at least one communication circuit (e.g., the communication circuit 150) configured to wirelessly receive the data from the system control device.

According to various embodiments, the at least one communication interface may be an RJ-45 supporting an RS-485 communication protocol.

According to various embodiments, the electronic device may further include at least one signal input/output interface (e.g., the signal input/output interfaces 562, 564, and 566) configured to transmit and/or receive a signal to and/or from an external device connected to the output terminal, wherein the controller is further configured to provide at least one trigger signal based on the data received from the system control device to the external device via the at least one signal input/output interface.

According to various embodiments, the electronic device may further include at least one sensor (e.g., the sensors 511, 512, and 513) configured to sense at least one of a voltage of the alternating current power, a current of the alternating current power, or a temperature of at least one point in the electronic device, wherein the controller is further configured to transmit at least one of the voltage, the current, or the temperature to the system control device via the at least one communication interface and/or the communication circuit.

Various embodiments provides an operation method of an electronic device including an input terminal configured to receive an alternating current (AC) power from an external source, an output terminal configured to output the alternating current power, an SSR configured to selectively connect the input terminal and the output terminal, a bypass circuit connected in parallel to the solid state relay (SSR) and configured to selectively connect the input terminal and the output terminal, and a controller. The SSR may include a zero-crossing detector configured to detect a zero voltage associated with at least one voltage of the input terminal and/or the output terminal. The operation method of the electronic device may include obtaining, by the controller, a power supply interruption command for the AC power while supplying the AC power received via the input terminal to the output terminal via the bypass circuit, turning on the SSR, based on the obtaining of the power supply interruption command, turning off the bypass circuit, based on the lapse of a first period after turning on the SSR, turning off the SSR, based on the lapse of a second period after turning off the bypass circuit, and stopping, by the SSR, outputting the AC power based on detecting, based on the zero-crossing detector, that the voltage becomes substantially 0V at the input terminal before the lapse of the second period after turning off the bypass circuit.

According to various embodiments, the operation method of the electronic device may further include obtaining, by the controller, a power supply command for the AC power before the AC power is supplied via the input terminal, turning on the SSR, based on the obtaining the power supply command, turning on the bypass circuit based on the lapse of a third period after the SSR is turned on, and turning off, by the controller, the SSR, based on the lapse of a fourth period after turning on the bypass circuit.

According to various embodiments, the electronic device may further include starting, by the SSR, outputting the AC power, based on detecting, based on the zero-crossing detector, that the voltage becomes substantially 0V at the input terminal before the lapse of the third period after turning on the SSR.

According to various embodiments, the electronic device may further include at least one signal input/output interface configured to transmit and/or receive a signal to and/or from an external device connected to the output terminal, and the operation method of the electronic device may further include providing at least one trigger signal based on data received from a system control device to the external device via the at least one signal input/output interface.

According to various embodiments, the operation method of the electronic device may further include sensing at least one of a voltage of the alternating current power, a current of the AC power, or a temperature of at least one point in the electronic device, and transmitting at least one of the voltage, the current, or the temperature to a system control device.

According to various embodiments, the operation method of the electronic device may further include receiving a control command based on at least one of the voltage, the current, or the temperature from the system control device, and performing a function corresponding to the control command.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    an input terminal configured to receive alternating current (AC) power from an external source;
    an output terminal configured to output the AC power;
    a solid state relay (SSR) configured to selectively connect the input terminal and the output terminal, the SSR comprising a zero-crossing detector, wherein the zero-crossing detector is configured to detect a zero voltage of a voltage associated with at least one voltage of the input terminal and/or the output terminal;
    a bypass circuit connected in parallel to the SSR and configured to selectively connect the input terminal and the output terminal; and
    a controller,
    wherein the controller is configured to:
        obtain a power supply interruption command while supplying the AC power received via the input terminal to the output terminal via the bypass circuit,
        turn on the SSR, based on the obtaining of the power supply interruption command,
        turn off the bypass circuit, based on the lapse of a first period after turning on the SSR, and
        turn off the SSR, based on the lapse of a second period after turning off the bypass circuit, and
    wherein the SSR is configured to stop outputting the AC power based on detecting, based on the zero-crossing detector, that the voltage becomes substantially 0V at the input terminal before the lapse of the second period after turning off the bypass circuit.

2. The electronic device of claim 1, wherein the SSR further comprises:
    a light emitting diode (LED) configured to emit light, based on a first signal from the controller;
    at least one photodiode configured to output a current according to the light from the LED; and
    at least one triac configured to be turned on, based on the detection of the substantially 0V by the zero-crossing detector, and the output of the current from the at least one photodiode.

3. The electronic device of claim 2, wherein the controller is configured to, as at least a part of the operation of turning on the SSR based on the obtaining of the power supply interruption command, output the current to the LED based on the obtaining of the power supply interruption command,
    wherein the LED is configured to emit the light, based on the current,
    wherein the at least one photodiode is configured to output the current, based on the light from the LED, and
    wherein the at least one triac is configured to be turned on based on the current and a time point of the detection of the substantially 0V.

4. The electronic device of claim 2, wherein the controller is configured to, as at least a part of the operation of turning off the SSR based on the lapse of the second period after turning off the bypass circuit, stop outputting the current to the LED,
    wherein the LED is configured to stop emitting the light, based on the current,
    wherein the at least one photodiode is configured to stop outputting the current, and
    wherein the at least one triac is configured to be turned off.

5. The electronic device of claim 2, wherein the at least one triac comprises at least one first triac connected between the input terminal and the output terminal in a first direction, and at least one two triac connected between the input terminal and the output terminal in a second direction opposite to the first direction.

6. The electronic device of claim 1, wherein the bypass circuit comprises a coil and a switch configured to be turned on based on a magnetic field from the coil, and
    wherein the controller is configured to, as at least a part of the operation of turning off the bypass circuit, stop providing a signal applied to the coil.

7. The electronic device of claim 6, further comprising a switching mode power supply (SMPS) configured to supply a direct current (DC) voltage having a designated value by the AC power input from the input terminal,
    wherein the controller is configured to provide the signal for the coil by using the DC voltage received from the SMPS.

8. The electronic device of claim 1, wherein the controller is configured to:
    obtain a power supply command for the AC power before the AC power is supplied via the input terminal,
    turn on the SSR, based on the obtaining of the power supply command,
    turn on the bypass circuit, based on the lapse of a third period after turning on the SSR, and
    turn off the SSR, based on the lapse of a fourth period after turning on the bypass circuit.

9. The electronic device of claim 8, wherein the SSR is configured to start outputting the AC power, based on detecting, based on the zero-crossing detector, that the voltage becomes substantially 0V at the input terminal before the lapse of the third period after turning on the SSR.

10. The electronic device of claim 1, further comprising a snubber circuit comprising at least one resistor or at least one capacitor,
    wherein the snubber circuit is connected in parallel to the bypass circuit and the SSR.

11. The electronic device of claim 1, further comprising at least one communication interface configured to receive data from a system control device by wire, or at least one communication circuit configured to wirelessly receive the data from the system control device.

12. The electronic device of claim 11, wherein the at least one communication interface is an RJ-45 supporting an RS-485 communication protocol.

13. The electronic device of claim 11, further comprising at least one signal input/output interface configured to transmit or receive a signal to or from an external device connected to the output terminal,
    wherein the controller is further configured to provide at least one trigger signal based on the data received from the system control device to the external device via the at least one signal input/output interface.

14. The electronic device of claim 11, further comprising at least one sensor configured to sense at least one of a voltage of the alternating current power, a current of the alternating current power, or a temperature of at least one point in the electronic device,
    wherein the controller is further configured to transmit at least one of the voltage, the current, or the temperature to the system control device via the at least one communication interface and/or the communication circuit.

15. An operation method of an electronic device comprising an input terminal configured to receive an alternating current (AC) power from an external source, an output terminal configured to output the alternating current power, an solid state relay (SSR) configured to selectively connect the input terminal and the output terminal, a bypass circuit connected in parallel to the SSR and configured to selectively connect the input terminal and the output terminal, and a controller, wherein the SSR comprises a zero-crossing detector configured to detect a zero voltage associated with at least one voltage of the input terminal and/or the output terminal, the method comprising:
- obtaining, by the controller, a power supply interruption command for the AC power while supplying the AC power received via the input terminal to the output terminal via the bypass circuit;
- turning on the SSR, based on the obtaining of the power supply interruption command;
- turning off the bypass circuit, based on the lapse of a first period after turning on the SSR;
- turning off the SSR, based on the lapse of a second period after turning off the bypass circuit; and
- stopping, by the SSR, outputting the AC power based on detecting, based on the zero-crossing detector, that the voltage becomes substantially 0V at the input terminal before the lapse of the second period after turning off the bypass circuit.

16. The method of claim 15, further comprising:
- obtaining, by the controller, a power supply command for the AC power before the AC power is supplied via the input terminal;
- turning on the SSR, based on the obtaining the power supply command;
- turning on the bypass circuit, based on the lapse of a third period after turning on the SSR; and
- turning off, by the controller, the SSR, based on the lapse of a fourth period after turning on the bypass circuit.

17. The method of claim 16, further comprising, starting, by the SSR, outputting the AC power, based on detecting, based on the zero-crossing detector, that the voltage becomes substantially 0V at the input terminal before the lapse of the third period after turning on the SSR.

18. The method of claim 15, wherein the electronic device further comprises at least one signal input/output interface configured to transmit and/or receive a signal to and/or from an external device connected to the output terminal, and
the operation method of the electronic device further comprises providing at least one trigger signal based on data received from a system control device to the external device via the at least one signal input/output interface.

19. The method of claim 15, further comprising sensing at least one of a voltage of the AC power, a current of the AC power, or a temperature of at least one point in the electronic device, and
transmitting at least one of the voltage, the current, or the temperature to a system control device.

20. The method of claim 19, further comprising
receiving a control command based on at least one of the voltage, the current, or the temperature from the system control device, and
performing a function corresponding to the control command.

* * * * *